United States Patent
Haga et al.

(10) Patent No.: US 7,334,224 B2
(45) Date of Patent: Feb. 19, 2008

(54) IMAGE PROCESSING APPARATUS AND DATA PROCESSING APPARATUS

(75) Inventors: Tatsuyoshi Haga, Tokyo (JP); Hiroshi Sasada, Tokyo (JP)

(73) Assignee: Konica Minolta Holdings, Inc., Tokyo (JP)

( * ) Notice: Subject to any disclaimer, the term of this patent is extended or adjusted under 35 U.S.C. 154(b) by 572 days.

(21) Appl. No.: 10/699,279

(22) Filed: Oct. 30, 2003

(65) Prior Publication Data

US 2004/0093598 A1 May 13, 2004

(30) Foreign Application Priority Data

| Nov. 8, 2002 | (JP) | ............................. 2002-324757 |
| Nov. 8, 2002 | (JP) | ............................. 2002-324781 |
| Nov. 27, 2002 | (JP) | ............................. 2002-343724 |
| Aug. 27, 2003 | (JP) | ............................. 2003-302942 |

(51) Int. Cl.
*G06F 9/45* (2006.01)

(52) U.S. Cl. ...................................... 717/168
(58) Field of Classification Search ................ 717/168; 709/221
See application file for complete search history.

(56) References Cited

U.S. PATENT DOCUMENTS

| 5,815,722 A | 9/1998 | Kalwitz et al. |
| 2002/0174173 A1* | 11/2002 | Gunturu ..................... 709/203 |
| 2003/0131083 A1* | 7/2003 | Inui et al. ................... 709/221 |
| 2004/0012821 A1* | 1/2004 | Nakajima .................... 358/302 |
| 2005/0086654 A1* | 4/2005 | Sumi et al. .................. 717/171 |

FOREIGN PATENT DOCUMENTS

| JP | 11-003299 A | 1/1999 |
| JP | 2000-029648 A | 1/2000 |
| JP | 2000-322244 A | 11/2000 |

* cited by examiner

*Primary Examiner*—John Chavis
(74) *Attorney, Agent, or Firm*—Frishauf, Holtz, Goodman & Chick, P.C.

(57) ABSTRACT

The present invention relates to an image processing apparatus for updating internally stored data, and a data processing apparatus for transmitting instruction information to the image processing apparatus for instructing the updating of data. According to the image processing apparatus and the data processing apparatus of the invention, in the processing for obtaining, from a server, update data that are required to update application data for the image processing apparatus, and for updating the application data, the update data acquisition method is pre-designated through the operating unit of the image processing apparatus or the data processing apparatus. When the updating instruction information is entered in the image processing apparatus through the operating unit of the data processing apparatus or the image processing apparatus, new update data are obtained from the server in accordance with the acquisition method designated for the image processing apparatus. Then, the application data stored in the data storage unit of the image processing apparatus are efficiently and easily rewritten to the new update data, without a special tool or hardware being required.

28 Claims, 17 Drawing Sheets

FIG. 7A

1. PROGRAM SERVER SETUP (FTP) — 131
■ USE ftp
PROGRAM SERVER ADDRESS
ftp: //abc. co. jp/com/version3/ — a1
USER ID [abc]  PASSWORD [*******]
       a2                       a3
2. FIREWALL SETUP
■ USE HTTP proxy    □ USE FTP proxy
FIREWALL IP ADDRESS  [10].[0].[16].[206] — a4
PORT  [8080] — a5

FIG. 7B

2. PROGRAM SERVER SETUP (HTTP) — 132
■ USE http
PROGRAM SERVER ADDRESS
http: //abc. co. jp/com/version3/ — a1
USER ID [abc]  PASSWORD [*******]
       a2                       a3
2. FIREWALL SETUP
■ USE HTTP proxy    □ USE FTP proxy
FIREWALL IP ADDRESS  [10].[0].[16].[206] — a4
PORT  [8080] — a5

FIG. 7C

3. PROGRAM SERVER SETUP (EMAIL) — 133
■ USE POP3    □ USE IMAP
RECEIVED EMAIL SERVER ADDRESS
mailserver. office. co. jp — b1
USER ID [abc]  PASSWORD [*******]
       b2                       b3
EMAIL ADDRESS
abc@mailserver. office. co. jp — b4

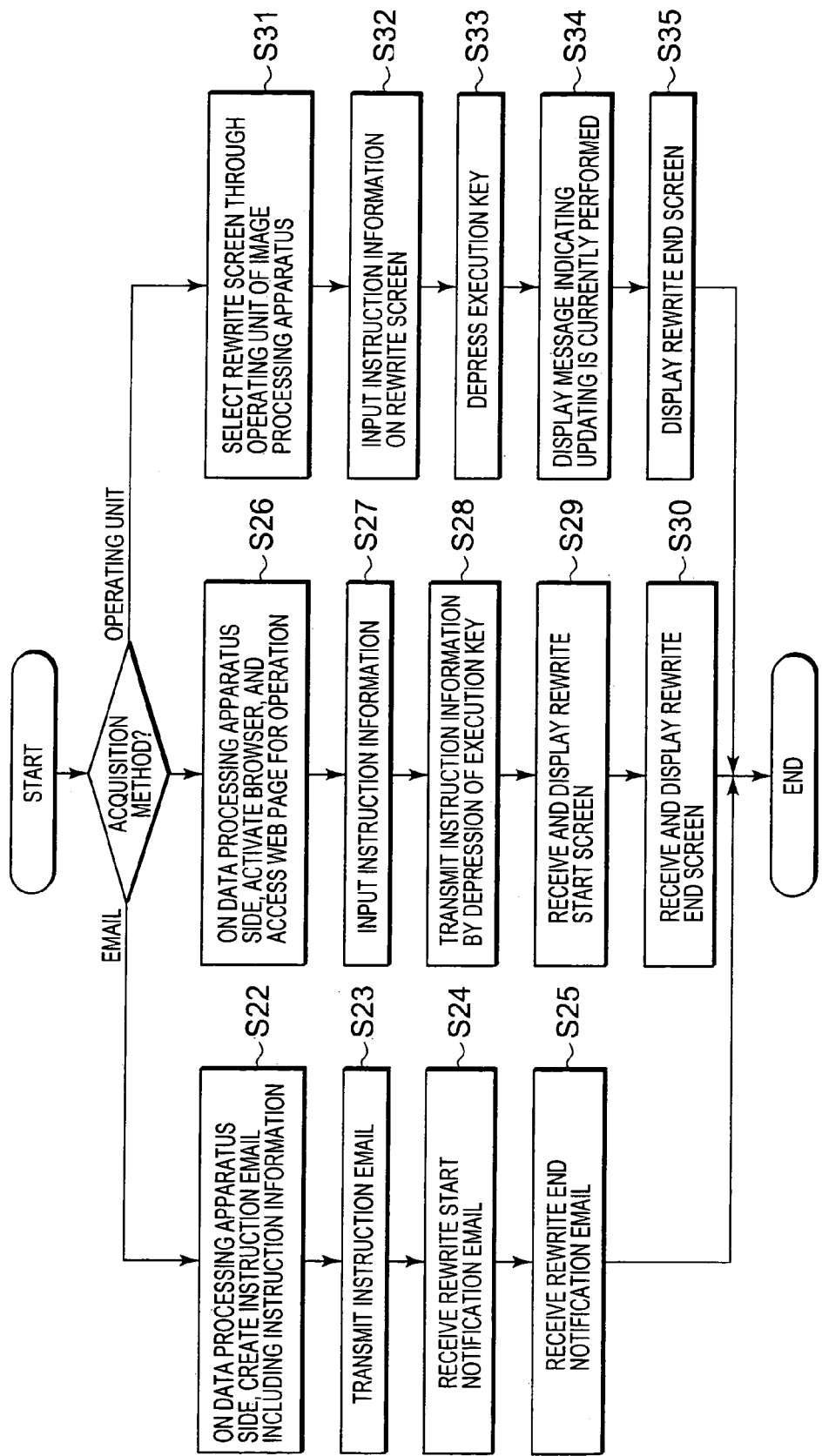

FIG. 17A

1. FILE SERVER SETUP (FTP) ~134
■ USE ftp
FILE SERVER ADDRESS
ftp: //abc. co. jp/com/version3/ ~i1
PORT 8010 ~i2
USER ID abc ~i3  PASSWORD ******** ~i4
2. FIREWALL SETUP
☐ USE HTTP proxy   ■ USE FTP proxy
FIREWALL IP ADDRESS  10 . 0 . 16 . 206 ~i5
PORT  i6~ 8080  [COMMUNICATION TEST] ~k2

FIG. 17B

2. FILE SERVER SETUP (HTTP) ~135
■ USE http
FILE SERVER ADDRESS
http: //abc. co. jp/com/version3/ ~i1
PORT 8010 ~i2
USER ID abc ~i3  PASSWORD ******** ~i4
2. FIREWALL SETUP
■ USE HTTP proxy   ☐ USE FTP proxy
FIREWALL IP ADDRESS  10 . 0 . 16 . 206 ~i5
PORT  i6~ 8080  [COMMUNICATION TEST] ~k2

FIG. 17C

3. FILE SERVER SETUP (EMAIL) ~136
■ USE POP3        ☐ USE IMAP
RECEIVED EMAIL SERVER ADDRESS
mailserver. office. co. jp ~j1
USER ID abc   PASSWORD ********
              j2              j3
EMAIL ADDRESS
abc@mailserver. office. co. jp ~j4

[COMMUNICATION TEST] ~k2

FIG. 19A

TEST RESULTS

TEST DATA CAN NOT BE RECEIVED. ← m1

ERROR CODE   [404] ← m2

FIG. 19B

TEST RESULTS

ANY COMMUNICATION ERROR IS NOT DETECTED, AND TEST DATA ARE NORMALLY RECEIVED.

CURRENT COMMUNICATION SPEED IS 100 KBPS. ESTIMATE TIME PERIODS FOR DATA RECEPTION AT THIS COMMUNICATION SPEED ARE AS FOLLOWS.

| DATA SIZE | ESTIMATE TIME |
|---|---|
| 1 M byte | 1 min. 20 sec. |
| 5 M bytes | 6 min. 40 sec. |
| 10 M bytes | 13 min. 20 sec. |

IMAGE PROCESSING APPARATUS AND DATA PROCESSING APPARATUS

BACKGROUND OF THE INVENTION

1. Field of the Invention

The present invention relates to an image processing apparatus for updating internally stored data, and a data processing apparatus for transmitting, to the image processing apparatus, an instruction to update the data.

2. Description of the Prior Art

Conventionally, an image processing apparatus is controlled by storing in nonvolatile memory in the main body of the apparatus image processing operation data, such as firmware programs (e.g., a display/manipulation program for an operating panel, a control program for individual mechanisms such as an image processing main body and a finisher, and an image processing program) and various setup data provided for firmware use (e.g., screen data displayed on the operating panel, setup data that include setup values used for bias control and for operating the individual mechanisms, and setup data that consist of various coefficient values related to image processing and setup values for special paper sizes), and by reading and executing these data. Hereinafter, these firmware programs and their various, accompanying setup data are called application data.

However, when a bug is found in application data, or a version is to be upgraded, the application data stored in the main body of the apparatus must be rewritten and updated using revised application data, hereinafter called update data. And conventionally, when employing these update data to change application data, the person responsible for performing this maintenance has had to proceed to the actual locale whereat the updating is to be performed, while carrying a personal notebook computer, a portable recording medium on which the update data has been stored and another, special tool (see, for example, JP-A-2000-322244).

Recently, however, in consonance with the development of advanced network techniques, many image processing apparatuses can be connected to a networks and in accordance with a predetermined rule, an instruction (command) can be transmitted externally, through a firewall, to the image processing apparatuses. For this, the common means employed is electronic mail (hereinafter referred to simply as E-mail). For example, when update data is enclosed with E-mail transmitted to image processing apparatuses, the updating of application data can also be performed at remote areas (see, for example, JP-A-2000-29648).

It is also possible for a file, in which a method is included for accessing designated update data, to be enclosed with an E-mail and to be transmitted to image processing apparatuses. The apparatuses can then analyze this access method and can obtain the designated update data (see, for example, JP-A-Hei 11-3299).

Further, a remote control technique has also been developed whereby data, stored in a server, are downloaded to a designated image processing apparatus across a network, and based on the data, an operation is performed by the image processing apparatus (see, for example, JP-A-Hei 6-214929). When this technique is employed, the update data can be downloaded by the image processing apparatus from the server in which they are stored, and the application data can be updated.

However, as is described above, when the person responsible for performing the maintenance travels to an actual locale to update the application data for an image processing apparatus, he or she must prepare a recording medium on which the update data are recorded and secure a special tool and a personal notebook computer. Since special tool types differ, depending on the image processing apparatus models, a person who maintains multiple clients must carry recording media and special tools that match all models of all image processing apparatuses installed at all destinations, a requirement that involves a great amount of labor and attendant high costs. In addition, since the transfer speed is low when a parallel cable and a USB cable are used to transfer data from a recording medium to an image processing apparatus, the time required for a data transfer is extended and job efficiency is reduced.

On the other hand, when E-mail is employed to update application data in accordance with an instruction received from a maintenance person at a remote area, the update data must be enclosed with the E-mail. However, when the update data to be enclosed are program data, such as firmware programs, the volume of the attached file is increased and may exceed the reception capacity of an E-mail server, and an extended period may be required for communication. Furthermore, because of recent improvements in network security techniques, entries made from outside a system to an internal, local network are sometimes limited. For example, when a file enclosed with an E-mail includes a computer executable program, access may be prevented by a firewall provided at the entrance of the local network.

Moreover, when an image processing apparatus is powered off or a copying operation is currently being performed, the reception of an E-mail is disabled, or even when an E-mail is received, the updating of the application data will not begin immediately. The updating of data may not, therefore, be performed within a set period of time, as intended by the maintenance person. And when an E-mail with which update data are enclosed is received by an image processing apparatus considerably later than the transmission date, the contents of the update data may already be old and thus regarded as useless. As is apparent from these examples, there is no guarantee that the updating of data will be performed immediately after an E-mail has been transmitted to an image processing apparatus, and therefore, the reliability with which application data is updated is low.

In addition, in order for update data to be obtained, the image processing apparatus must designate, for a firewall installed for the local network on the image processing apparatus side, various setup data, the address of a server, communication parameters such as a communication protocol, and an ID and a password required for accessing the server. If the setup data are erroneously designated, a communication error occurs during the data acquisition process and the update data can not be obtained.

Conventionally, in order to confirm that application data can be received normally, after setup data such as the communication parameter and the ID have been designated, the image processing apparatus actually obtains the update data from the server. However, when the application data comprise a large quantity of program data, the time required to obtain the update data is extended, and after the data have been received, the performance of the automatic data updating process can not be avoided. Since the person performing the maintenance must wait until the updating has been completed, the efficiency of the maintenance job is not satisfactory.

Further, even if only a small amount of application data is involved, deterioration of the communication state may occur due to a change in the communication load, and an extended period of time may be required to obtain the data.

However, since the person performing the maintenance will have no advance knowledge of how much time data acquisition will require, he or she can not employ an appropriate process, such as delaying the confirmation job for data acquisition and performing another job.

SUMMARY OF THE INVENTION

To resolve these shortcomings, it is a first objective of the present invention to provide an image processing apparatus and a data processing apparatus that can efficiently and easily update application data without special tools or hardware being required.

It is a second objective of the present invention to provide an image processing apparatus and a data processing apparatus that can set conditions for a validity term or a validity limit for updating application data, and can prevent execution of the updating process in accordance with an old instruction.

It is a third objective of the present invention to provide an image processing apparatus and a data processing apparatus that can easily determine whether setup data required for the acquisition of update data are designated correctly, and can improve the efficiency of the maintenance job.

To achieve these objectives, according to a first aspect of the present invention, an image processing apparatus comprises:

a data storage unit for storing application data concerning the usage of the image processing apparatus so that the application data can be rewritten;

a controller for controlling the operation of the image processing apparatus based on the application data stored in the data storage unit;

a data acquisition unit for accessing a server that stores application data, used for updating, as update data and for obtaining the update data;

a data updating unit for rewriting the application data stored in the data storage unit to provide the update data obtained by the data acquisition unit; and an acquisition method storage unit for storing, in advance, an acquisition method designated for obtaining the update data, wherein, when instruction information for instructing the updating of the application data is entered in the image processing apparatus, the data acquisition unit accesses the server in accordance with the acquisition method stored in the acquisition method storage unit and obtains the update data.

The application data is data concerning the usage of the image processing apparatus, and includes, for example, program data for firmware integrated with computer hardware, machine setup data, and setup data designated in accordance with user specifications. The update data is data employed for updating the application data, and includes, for example, data for the latest firmware version and the backup setup data that are temporarily stored in the server in order to exchange the image processing apparatuses.

According to a second aspect of the present invention, for the image processing apparatus of the first aspect, the acquisition method storage unit stores setup data that are requited to obtain the update data using the designated acquisition method.

According to a third aspect of the present invention, for the image processing apparatus of the first aspect, the acquisition method storage unit stores, as the setup data, at least one address for the server for storing update data and an ID or a password for accessing the server.

According to a fourth aspect of the present invention, for the image processing apparatus of one of the first to the third aspects, the acquisition method is a method for using HTTP (Hyper-Text Transfer Protocol) or FTP (File Transfer Protocol).

According to a fifth aspect of the present invention, for the image processing apparatus of the fourth aspect, the instruction information includes data type information indicating the type of the update data. Based on, at the least, either data type information included in the instruction information or one of several identification data sets for a serial number unique to the image processing apparatus, a product number, a model name, a product version, a model version or an application data version that is stored in the image processing apparatus, the data acquisition unit specifies update data stored in an HTTP server or an FTP server and obtains the specified update data from the HTTP server or the FTP server.

According to a sixth aspect of the present invention, for the image processing apparatus according to one of the first to the third aspects, the acquisition method is a method for using electronic mail.

According to a seventh aspect of the present invention, for the image processing apparatus of one of the first to the sixth aspects, the instruction information is entered through using an operating unit of the image processing apparatus, or is received from an external device connected to the image processing apparatus.

According to an eighth aspect of the present invention, the image processing apparatus according to one of the first to the seventh aspects further comprises:

a validity condition setup unit for setting a condition, for a validity term or a validity limit, under which the data acquisition unit obtains the update data or the data update unit updates the application data; and an inhibiting unit for inhibiting, when the instruction information entered for the image processing apparatus does not satisfy the condition designated by the validity condition setup unit, the operation of the data acquisition unit for acquiring the update data, or the data updating unit for updating the application data.

According to a ninth aspect of the present invention, the image processing apparatus according to one of the first to the eighth aspects further comprises:

a validity condition setup unit for setting a condition, for a validity term or a validity limit, under which the data acquisition unit obtains the update data or the data update unit updates the application data; and an instruction error notification unit for, when the instruction information entered for the image processing apparatus does not satisfy the condition designated by the validity condition setup unit, issuing a notification to a transmission source of the instruction information that the instruction information does not satisfy the condition concerning the validity term or the validity limit.

According to a tenth aspect of the present invention, for the image processing apparatus according to the eighth or ninth aspect, the validity condition setup unit designates the condition concerning the validity term or the validity limit based on validity information for the validity term or the validity limit included in the instruction information, or in accordance with an instruction received from an external device connected to the image processing apparatus or an instruction entered using the operating unit of the image processing apparatus.

According to an eleventh aspect of the present invention, for the image processing apparatus of one of the first to the tenth aspects, the data acquisition unit accesses the server by using the acquisition method stored in the acquisition method storage unit, and obtains test data for a communication test.

According to a twelfth aspect of the present invention, the image processing apparatus of the eleventh aspect further comprises:

an error detection unit for, when the test data are obtained by the data acquisition unit, detecting an error that has occurred before the test data are obtained, or an error in the obtained test data; and a communication error notification unit for providing notification that the error has been detected by the error detection unit.

According to a thirteenth aspect of the present invention, an image processing apparatus comprises:

a data storage unit for storing application data, concerning the usage of the image processing apparatus, so that the application data can be rewritten;

a controller for controlling the operation of the image processing apparatus based on the application data stored in the data storage unit;

a data acquisition unit for accessing a server that stores application data used for updating as update data, and for obtaining the update data;

a data updating unit for rewriting the application data, stored in the data storage unit, as the update data obtained by the data acquisition unit; and an acquisition method selection unit for selecting, from among a plurality of acquisition methods prepared to obtain update data, an acquisition method to be used for the acquisition of the update data, wherein, when instruction information for instructing the updating of the application data is entered in the image processing apparatus, the data acquisition unit accesses the server, by using the acquisition method selected by the acquisition method selection unit, and obtains the update data.

According to a fourteenth aspect of the present invention, for the image processing apparatus of the thirteenth aspect, the acquisition method selection unit selects an acquisition method used for the acquisition of update data, and designates setup data required to obtain update data using the acquisition method.

According to a fifteenth aspect of the present invention, for the image processing apparatus of the thirteenth or fourteenth aspect, the setup data includes, at the least, one address for the server used to store the update data, and a required ID or password for accessing the server.

According to a sixteenth aspect of the present invention, for the image processing apparatus of the fifteenth aspect, based on setup data entered using an operating unit for the image processing apparatus or setup data entered using an external device connected to the image processing apparatus, the acquisition method selection unit designates required setup data by using the acquisition method employed to obtain the update data.

According to a seventeenth aspect of the present invention, an image processing apparatus comprises:

a data storage unit for storing application data, concerning the usage of the image processing apparatus, so that the application data can be rewritten;

a controller for controlling the operation of the image processing apparatus based on the application data stored in the data storage unit;

a data acquisition unit for accessing a server that stores application data used for updating as update data, and for obtaining the update data; and a data updating unit for rewriting the application data, stored in the data storage unit, to provide the update data obtained by the data acquisition unit, wherein a plurality of acquisition methods are selectaly prepared, in advance, and are used for the acquisition of update data.

According to an eighteenth aspect of the present invention, an image processing apparatus comprises:

a data storage unit for storing application data, concerning the usage of the image processing apparatus, so that the application data can be rewritten;

a controller for controlling the operation of the image processing apparatus based on the application data stored in the data storage unit;

a data acquisition unit for accessing a server that stores application data used for updating as update data, and for obtaining the update data; and a data updating unit for rewriting the application data stored in the data storage unit to provide the update data obtained by the data acquisition unit, wherein, when instruction information, for instructing the updating of the application data, is entered in the image processing apparatus, the data acquisition unit specifies update data, stored in the server, based on, at the least, either data type information indicating the type of update data included in the instruction information or identification information, stored in the image processing apparatus, for identifying individual image processing apparatuses and for obtaining the specified update data from the server.

According to a nineteenth aspect of the present invention, for the image processing apparatus of the eighteenth aspect, the identification information includes one of a serial number unique to the image processing apparatus, a product name, a model name, a product version, a model version or an application data version.

According to a twentieth aspect of the present invention, an image processing apparatus comprises:

a data storage unit for storing application data, concerning the usage of the image processing apparatus, so that application data can be rewritten;

a controller for controlling the operation of the image processing apparatus, based on the application data stored in the data storage unit;

a data acquisition unit for accessing a server that stores application data used for updating as update data, and for obtaining the update data;

a data updating unit for rewriting the application data, stored in the data storage unit, to provide the update data obtained by the data acquisition unit;

a validity condition setup unit for setting a condition, for a: validity term or a validity limit, under which the application data is updated by the data updating unit; and an inhibiting unit for inhibiting, when the condition set by the validity condition setup unit is not satisfied, the operation of the data updating unit for updating the application data.

According to a twenty-first aspect of the present invention, an image processing apparatus comprises:

a data storage unit for storing application data, concerning the usage of the image processing apparatus, so that the application data can be rewritten;

a controller for controlling the operation of the image processing apparatus based on the application data stored in the data storage unit;

a data acquisition unit for accessing a server that stores, as update data, application data used for updating, and obtaining the update data;

a data updating unit for rewriting the application data, stored in the data storage unit, to provide the update data obtained by the data acquisition unit;

a validity condition setup unit for setting a condition, for a validity term or a validity limit, under which the application data is updated by the data updating unit; and an inhibiting unit for inhibiting, when the condition set by the validity condition setup unit is not satisfied, the operation of the data acquisition unit for obtaining the application data.

According to a twenty-second aspect of the present invention, the image processing apparatus of the twentieth or twenty-first aspect further comprises:

an instruction error notification unit for issuing, when the instruction information entered in the image processing apparatus for instructing the updating of the application data does not satisfy the condition designated by the validity condition setup unit, a notification provided for a transmission source of the instruction information to the effect that the instruction information does not satisfy the condition for the validity term or the validity limit.

According to a twenty-third aspect of the present invention, for the image processing apparatus of the twenty-second aspect, the validity condition: setup unit designates the condition, for the validity term or the validity limit, based on validity information for the validity term or the validity limit that is included in the instruction information, or in accordance with an instruction received from an external device connected to the image processing apparatus or an instruction entered at an operating unit of the image processing apparatus.

According to a twenty-fourth aspect of the present invention, provided is a data processing apparatus that transmits, to an image processing apparatus that stores application data that concerns the usage of the image processing apparatus and that is to be rewritten, instruction information instructing the acquisition, from a server, of update data for the application and the rewriting of the application using the update data, wherein validity data designating a condition for a validity term or a validity limit, for obtaining the update data or for updating the application data, are added to the instruction information and are transmitted to the image processing apparatus.

According to a twenty-fifth aspect of the present invention, an image processing apparatus comprises:

a data storage unit for storing application data, concerning the usage of the image processing apparatus, so that the application data can be rewritten;

a controller for controlling the operation of the image processing apparatus based on the application data stored in the data storage unit;

a data acquisition unit for accessing a server that stores application data used for updating as update data, and for obtaining the update data; and a data updating unit for rewriting the application data stored in the data storage unit using the update data obtained by the data acquisition unit, wherein, upon receiving an instruction to obtain test data for a communication test, the data acquisition unit accesses the server in which test data are stored and obtains the test data from the server.

According to a twenty-sixth aspect of the present invention, the image processing apparatus of the twenty-fifth aspect further comprises:

an error detection unit for, when the test data are obtained by the data acquisition unit, detecting an error that occurred up until the test data were obtained, or an error in the obtained test data; and a communication error notification unit for transmitting notification of the error detected by the error detection unit.

According to a twenty-seventh aspect of the present invention, a data processing apparatus, which transmits, to an image processing apparatus that stores application data, concerning the usage of the image processing apparatus, that is to be rewritten, instruction information instructing the acquisition from a server of update data for the application, and the rewriting of the application using the update data, comprises:

a setup instruction unit for instructing the image processing apparatus to instruct the setup of an acquisition method for obtaining the update data; and a data acquisition instruction unit for instructing the image processing apparatus to obtain test data for a communication test.

According to a twenty-eighth aspect of the present invention, the image processing apparatus of one of the first to the twenty-third, the twenty-fifth and the twenty-sixth aspects inhibits the data acquisition unit from obtaining the update data, or the data updating unit from updating the application data, while the image processing apparatus is performing another process.

As is apparent from the above aspects, the following effects are obtained for the individual aspects of the present invention.

According to the first aspect, since the update data are obtained by the acquisition method stored in advance in the image processing apparatus, the data updating can be performed by using a simple operation, such as the transmission of instruction information from the data processing apparatus to the image processing apparatus, or the direct entry of instruction information through the operating unit of the image processing apparatus. Therefore, the application data can be updated efficiently and easily without a special tool or hardware being required. Further, since the acquisition method is designated in advance, a complex operation for designating an acquisition method each time the application data are to be updated can be eliminated. Therefore, the data updating can be simultaneously instructed, e.g., the instruction information can be simultaneously transmitted to multiple image processing apparatuses, and the efficiency of the maintenance performed by the person responsible for the maintenance is increased.

According to the second and third aspects, information, such as the address of a server and an ID and a password for accessing the server, can be stored as required setup data for obtaining the update data. Therefore, it is not necessary for the setup information to be entered each time the updating of data is instructed, and the job efficiency can be improved.

According to the fourth aspect, since HTTP or FTP is employed as the method for obtaining the update data, a common network means, such as the Internet, can be used to obtain the update data.

According to the fifth aspect, the update data to be obtained are designated based on either the data type information or, at the least, one of the identification information sets in the image processing apparatus, and the update data are obtained from the HTTP or FTP server. Therefore, to enter the update instruction, the maintenance person need not designate the update data in detail, and the maintenance job is facilitated. Further, a human error, such as an input error, can be prevented, and the required update data can be correctly obtained.

According to the sixth aspect of the invention, since an E-mail is employed as the method for obtaining the update data, an image processing apparatus, even one connected to a network in a local area, can obtain update data, while the network security is maintained at a constant level.

According to the seventh aspect of the invention, in accordance with the maintenance job style, either the operating unit of the image processing apparatus, or an external device connected to the image processing apparatus, can be selected to enter the instruction information.

According to the eighth aspect, the use can be prevented of old instruction information, for which the validity term has expired or the validity limit has been reached, for the execution of the process.

According to the ninth aspect, the maintenance person who has transmitted the instruction information can confirm that the validity term has expired or the validity limit has been reached for the instruction information, and can employ an appropriate process, such as the transmission of new instruction information.

According to the tenth aspect, an appropriate method for setting the validity term or the validity limit can be selected in accordance with the maintenance job style, i.e., the validity term or the validity limit can be designated either by using the instruction information, or through a external device or directly by using the operating unit of the image processing apparatus. Therefore, the maintenance job efficiency can be improved.

According to the eleventh or the twelfth aspect, after the necessary setup information has been designated by using a pre-designated method to obtain the update data, a communication test can be conducted to determine whether the setup process has been performed normally. Thus, the maintenance job efficiency can be increased.

According to the thirteenth aspect, since the update data are obtained by the acquisition method stored in advance in the image processing apparatus, the updating of data can be performed by employing a simple operation, such as the transmission of instruction information from the data processing apparatus to the image processing apparatus, or the direct entry of instruction information through the operating unit of the image processing apparatus. Therefore, without a special tool or hardware being required, the application data can be efficiently and easily updated. In addition, from among a plurality of acquisition methods that have been prepared in advance, the optical acquisition method can be selected in accordance with the style of the maintenance job. Furthermore, since an acquisition method is designated in advance, a complex operation for selecting an acquisition method each time application data are updated can be eliminated. Thus, the data updating instruction can be simultaneously issued, e.g., instruction information can be simultaneously transmitted to a plurality of image processing apparatuses, so that the efficiency of the maintenance job performed by the maintenance person can be increased.

According to the fourteenth or the fifteenth aspect, information, such as the address of a server and an ID and a password for accessing the server can be stored as setup information required to obtain the update data. Therefore, the setup information need not be entered each time a data updating instruction is issued, and the job efficiency is improved.

According to the sixteenth aspect, a method for designating the setup information required for obtaining the update data can be selected in accordance with the maintenance job style.

According to the seventeen aspect, since the update data are obtained by using an acquisition method stored in advance in the image processing apparatus, the updating of data can be performed by employing a simple operation, such as the transmission of instruction information from the data processing apparatus to the image processing apparatus, or the direct entry of instruction information through the operating unit of the image processing apparatus. Therefore, the application data can be updated efficiently and easily without a special tool or hardware being required. Furthermore, from among a plurality of acquisition methods that are prepared in advance, the optimal acquisition method can be selected in accordance with the maintenance job style. In addition, since the acquisition method is pre-designated, a complex operation for designating an acquisition method each time the application data are updated can be eliminated. Therefore, a data updating instruction can be simultaneously issued, e.g., the instruction information can be simultaneously transmitted to a plurality of image processing apparatuses. As a result, the efficiency of the maintenance job performed by the maintenance person can be improved.

According to the eighteenth or nineteenth aspect, since the update data are obtained by using the acquisition method stored in advance in the image processing apparatus, the updating of data can be performed by employing a simple operation, such as the transmission of instruction information from the data processing apparatus to the image processing apparatus, or the direct entry of instruction information through the operating unit of the image processing apparatus. As a result, without a special tool or hardware being required, the application data can be updated efficiently and easily. Further, since either the data type information, or, at the least, one of the identification information sets stored in the image processing apparatus is employed to specify target update data and to obtain the update data from the server, the maintenance person need not specify update data in detail when instructing the updating of data. Therefore, the maintenance job is simplified, a human error such as an input error can be prevented, and the required update data can be correctly obtained.

According to the twentieth or twenty-first aspect, since the update data are obtained by the acquisition method stored in advance in the image processing apparatus, the updating of data can be performed by employing a simple operation, such as the transmission of instruction information from the data processing apparatus to the image processing apparatus, or the direct entry of instruction information through the operating unit of the image processing apparatus. Therefore, without a special tool or hardware being required, the application data can be updated efficiently and easily. Further, since a condition concerning the validity term or the validity limit can be included in the instruction information, the use, for the execution of the process, of old instruction information for which the validity term has expired or the validity limit has been reached can be prevented.

According to the twenty-second aspect, since the maintenance person who has transmitted the instruction information can confirm that the validity term has expired or the validity limit has been reached for the instruction information, he or she can take an appropriate action, such as the transmission of new instruction information.

According to the twenty-third aspect, since an appropriate method for setting the validity term or the validity limit can be selected in accordance with the maintenance job style, the maintenance job efficiency is increased.

According to the twenty-fourth aspect, since the validity term or the validity limit can be designated by using the data processing apparatus, the designation of the validity term or the validity limit can be performed at a remote area.

According to the twenty-fifth and the twenty-sixth aspects, for example, after the required setup information has been set up by using a pre-designated method for acquiring the update data, a communication test can be conducted to determine whether the setup process has been performed normally. Therefore, whether the setup is correct or wrong can be easily determined, and the maintenance job efficiency can be improved.

According to the twenty-seventh aspect, since the data processing apparatus can be employed to designate the update data acquisition method and to instruct the execution of a communication test using test data, the update data acquisition method can be designated at a remote area, and an instruction for the communication test can be issued.

According to the twenty-eighth aspect, the acquisition of update data or the updating of data is performed during the image processing, and the issue of an interrupt by a user can be prevented.

The above, and many other objects, features and advantages of the present invention, will become manifest to those skilled in the art upon referring to the following detailed description and the accompanying drawings, in which preferred embodiments incorporating the principle of the present invention are shown by the provision of illustrative examples.

BRIEF DESCRIPTION OF THE DRAWINGS

FIGS. 7A to 7C are diagrams showing example setup input screens used to designate data acquisition methods, ftp, http and E-mail, respectively;

FIG. 8 is a flowchart for explaining the data update instruction processing performed by the data processing apparatus or the image processing apparatus;

FIGS. 17A to 17C are diagrams showing example setup input screens for designating data acquisition methods, ftp, http and E-mail, that are displayed by a data processing apparatus according to a third embodiment of the present invention;

FIG. 19A is a diagram showing an example test result screen displayed when an error is detected during a communication test; and FIG. 19B is a diagram showing an example test screen displayed when no error is detected during the communication test.

DETAILED DESCRIPTION OF THE PREFERRED EMBODIMENTS

First Embodiment

According to a first embodiment of the present invention, an explanation will now be given for an example wherein a method, for obtaining update data used for an image processing apparatus, is pre-designated through the operating unit of a data processing apparatus or the image processing apparatus, and wherein, when update instruction information is entered in the image processing apparatus through the operation unit of the data processing apparatus or the image processing apparatus, new update data are obtained from a server using the acquisition method designated for the image processing apparatus, and application data concerning the usage of the image processing apparatus are updated.

Figure 1:
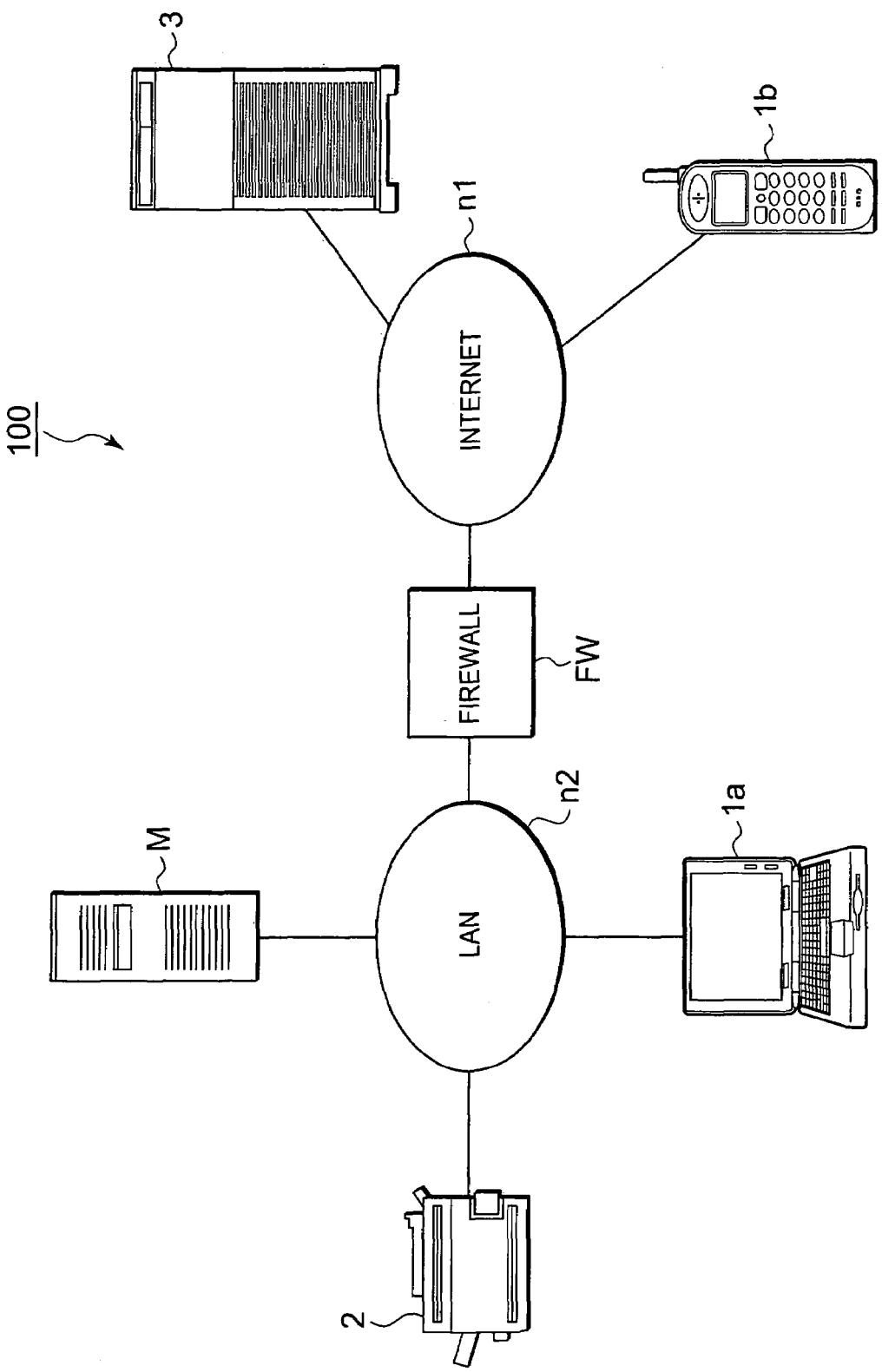
FIG. 1 is a conceptual diagram showing the general, overall configuration of a data processing system for the preferred embodiments of the present invention.

FIG. 1 is a conceptual diagram showing the general, overall configuration of a data processing system 100 that comprises an image processing apparatus and data processing apparatuses according to this embodiment As is shown in FIG. 1, the data processing system 100 comprises: data processing apparatuses 1a and 1b; an image processing apparatus 2; a server 3; and an E-mail server M. The image processing apparatus 2, the data processing apparatus 1*b* and the server 3 are connected by the Internet n1 so they can access each other, while the image processing apparatus 2, the data processing apparatus 1*a* and the E-mail server M are connected by a LAN (Local Area Network) n2, which is a network deployed for a limited area.

The data processing apparatuses 1*a* and 1*b* can be, for example, portable telephone terminals such as portable telephones or PHSes (Personal Handyphone Systems), or personal notebook computers (PCs). Each of the data processing apparatuses 1*a* and 1*b*, which include E-mail software for receiving E-mails and browser software for browsing web pages, employs an E-mail or a browser to generate instruction information related to maintenance, and to transmit this information to the image processing apparatus 2. The data processing apparatus 1*a* is connected to the image processing apparatus 2 across the LAN n2 inside the system, while the data processing apparatus 1*b* is connected to the image processing apparatus 2 across the open Internet n1 outside the system.

The image processing apparatus 2 can be, for example, a copier, a printer, an MFP (Multifunction Peripheral), a printer, a printer data provision terminal (e.g., a kiosk terminal) or a multifunction apparatus. Further, software for providing contents to be browsed by a WWW (World Wide Web) browser is installed in the image processing apparatus 2, so that the image processing apparatus 2 includes a web server function in addition to the image processing function. The image processing apparatus 2 is connected to the Internet n1 through a firewall FW.

The E-mail server M manages the transmission/reception of E-mail for the apparatuses connected to the LAN n2. The firewall FW is constituted by a proxy server, for example, and restricts entry to the LAN n2 from outside. For example, data transmitted at the boundary between the LAN n2 and the outside, and communication requests transmitted across the Internet n1 are monitored, and unauthorized communications are blocked.

The server 3 is constituted by a general purpose personal computer, and includes firmware, consonant with the model of the image processing apparatus; and a database, in which update data, such as various setup data, are stored in accordance with the hierarchical directory structure. Upon receiving a request from the image processing apparatus 2, the server 3 provides required data for the image processing apparatus 2 across the Internet n1.

The internal arrangements, according to the invention, of the data processing apparatuses 1*a* and 1*b*, the image processing apparatus 2 and the server 3 will now be described.

First, the data processing apparatuses 1*a* and 1*b* will be described. Since substantially the same arrangement is employed for the data processing apparatuses 1*a* and 1*b*, the arrangement and the operation of the data processing apparatus 1*a* will specifically be explained.

Figure 2:
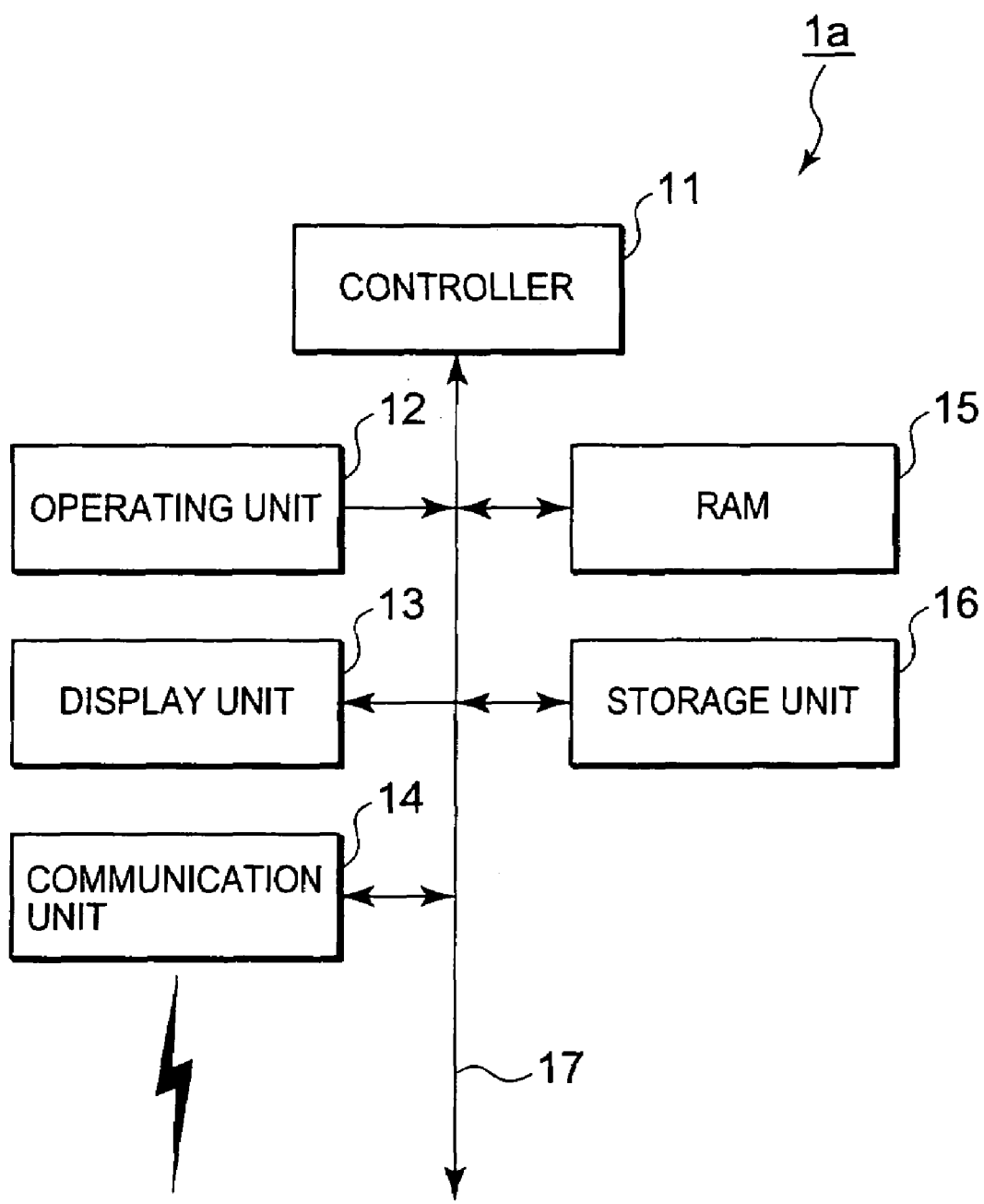
FIG. 2 is a diagram showing the internal arrangement of a data processing apparatus.

The internal arrangement of the data processing apparatus 1*a* is shown in FIG. 2.

As is shown in FIG. 2, the data processing apparatus 1*a* comprises: a controller 11, an operating unit 12, a display unit 13, a communication unit 14, a RAM 15 and a storage unit 16, all of which are interconnected by a bus 17.

The controller 11, which is, for example, a CPU (Central Processing Unit), opens in the RAM 15 various system programs stored in the storage unit 16 and an acquisition method setup program (see FIG. 6) and a data update instruction program (see FIG. 8) that relate to the present invention, and in cooperation with these programs, provides total control for the processing operations.

In the acquisition method setup processing, in accordance with an instruction entered through the operating unit 12, the controller 11 generates instruction information or an instruction E-mail to instruct the setting up of an update data acquisition method that is employed by the image processing apparatus 2, and transmits the instruction information through the communication unit 14.

In the data updating instruction processing, in accordance with an instruction entered through the operating unit 12, the controller 11 generates instruction information or an instruction E-mail to instruct the updating of application data stored in the image processing apparatus 2, and transmits the instruction information through the communication unit 14.

The operating unit 12 includes character keys, numeric keys and various other types of keys that are correlated with various functions, and outputs, to the controller 11, an operating signal that corresponds to a manipulated key. That is, to designate an update data acquisition method used by the image processing apparatus 2, the image processing apparatus 2 need only transmit the setup instruction information through the operating unit 12 for this apparatus 2 to serve as a setup instruction unit.

The display unit 13 has a display screen, such as an LCD (Liquid Crystal Display), and in accordance with an instruction received from the controller 11, various data, such as the contents entered through the operating unit 12 and web screen data exchanged through the communication unit 14, are displayed on the display unit 13.

The communication unit 14 is an interface, such as a network interface card, a modem (modulator/demodulator), a USB (Universal Serial Bus), or the communication function of a portable telephone.

The RAM 15 is used as a work area to temporarily store various programs executed by the controller 11 and data related to these programs.

The storage unit 16 includes a recording medium, such as a flash memory or another rewritable semiconductor storage device, and various programs that are executed by the controller 11, and data that are related to these programs are stored on the recording medium.

The internal arrangement of the image processing apparatus 2 will now be explained while referring to FIG. 3.

Figure 3:
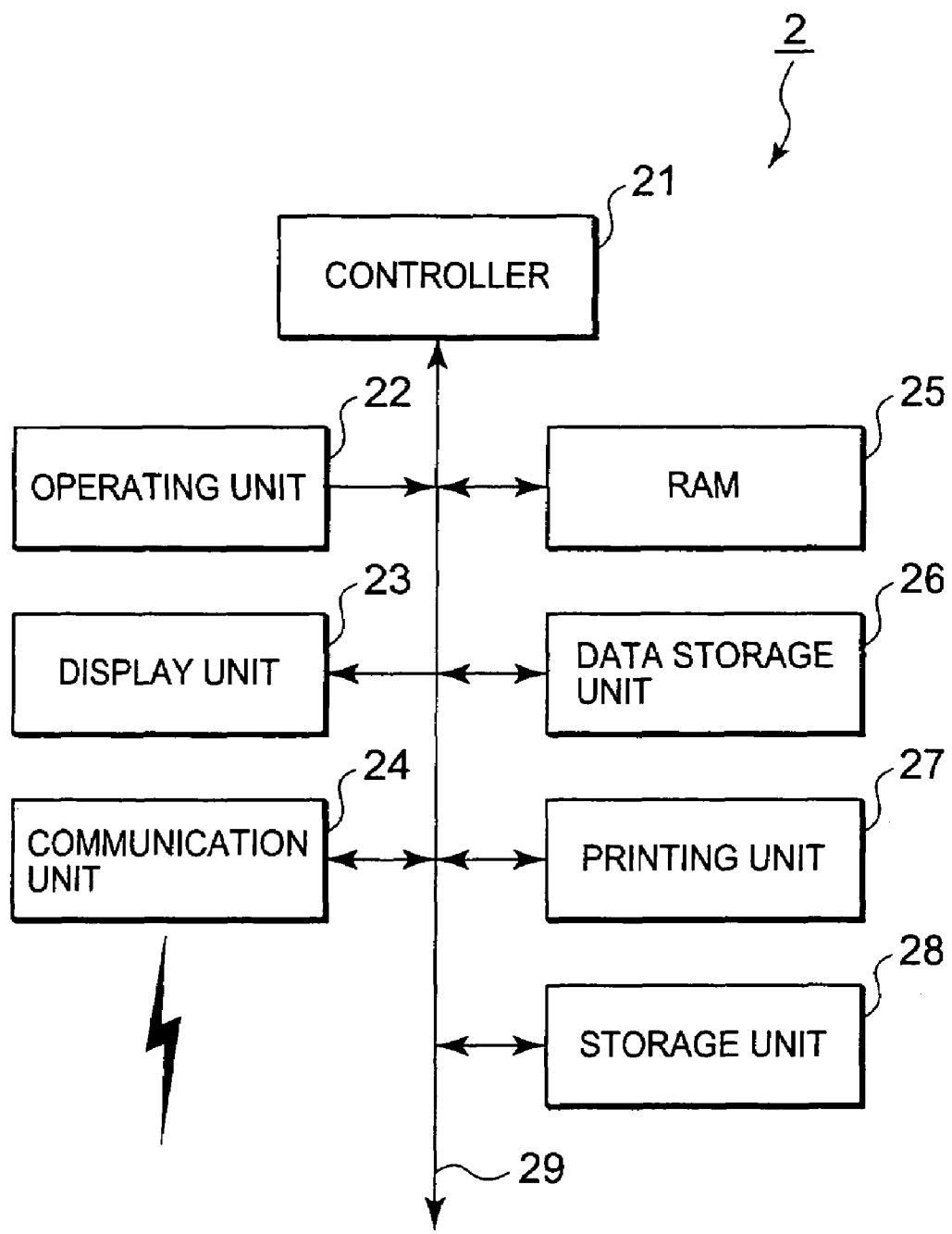
FIG. 3 is a diagram showing the internal arrangement of an image processing apparatus.

As is shown in FIG. 3, the image processing apparatus 2 comprises a controller 21 for controlling the entire apparatus, an operating unit 22, a display unit 23, a communication unit 24, a RAM 25, a data storage unit 26, a printing unit 27 and a storage unit 28, all of which are interconnected by a bus 29.

The controller 21 opens, in the RAM 25, a system program and a printing program stored in the storage unit 28 and a data updating program (see FIG. 12) relating to the present invention, and to provide the data acquisition function and the data updating function, exercises total control of the processing operation in cooperation with these programs.

In the data updating processing, when an E-mail instructing the updating of application data is received from the data processing apparatus 1*a* or 1*b*, or when instruction information for the updating of application data is entered via a browser, or through the operating unit 22, update data to be obtained from the server 3 are designated based on data type information indicating the type of update data included in the instruction E-mail or the instruction information, or based, at the least, on one of the identification information sets for the image processing apparatus 1 that are stored in the data storage unit 26.

Then, as an acquisition method used to obtain update data, the pre-designated information for the acquisition method is read from the data storage unit 26, and in accordance with this acquisition method, the communication unit 24 is controlled to access the server 3 and obtain new update data from a database (hereinafter referred to as a DB) 34. When the update data are obtained, the application data stored in the data storage unit 26 are rewritten as the new update data.

The operating unit 22 includes a key group including a cursor key, a numeric input key and various function keys, and a touch panel integrally formed with the display unit 23, and outputs, to the controller 22, a depression signal that corresponds to a depressed key.

The display unit 23 has a display screen formed of an LCD, for example, and in accordance with an instruction received from the controller 22, various data, such as the contents entered through the operating unit 22 and operating screen data, are displayed on the display unit 23.

The communication unit 24 is an interface connectable to a transfer medium that is connected to a network, such as the Internet n1 or the LAN n2. The communication unit 24 is constituted by a modem or a terminal adaptor (TA), and communicates with an external device across a communication line, such as a telephone line, an ISDN line, a wireless communication line, a special line or a CATV line.

The RAM 25 is used as a work area for temporarily storing various programs executed by the controller 21 and data processed by these programs.

The data storage unit 26 is used to store data that are less frequently rewritten and the acquisition method related to the present invention. For example, application data concerning the usage of the image processing apparatus 2 are stored in the data storage unit 26.

Further, identification information for identifying an individual image processing apparatus 2, e.g., a serial number unique to the image processing apparatus 2, a product name, a model name, a model version and the application data version, are stored in the data storage unit 26. In addition, the designated acquisition method for obtaining update data from the server 3 is stored in the data storage unit 26, as well as communication parameters that include the address of the server 3, a firewall IP address for passing through the firewall FW and a connection port, and an ID and a password for accessing the server 3, which are stored as setup data that are required when the acquisition method is employed to access the server 3 and to obtain the update data therefrom.

The printing unit 27 includes a sheet supply unit, wherein a continuous form or separate sheets are stacked as printing sheets, and a sheet discharge unit (neither of which is shown). The printing unit 27 employs an electrophotographic system that uses an infrared laser beam or a light beam emitted by an LED (Light-Emitting Device) to output print data that have been received from the controller 21 or from an external device through the communication unit 24, transfers the print data to a printing sheet, and discharges the resultant printed sheet.

The storage unit 28 is supplied with a recording medium (not shown) on which programs and data are stored in advance. This recording medium is a magnetic or optical recording medium or a semiconductor memory, which is fixed to or detachably mounted on the storage unit 28. A system program, various process programs corresponding to this system and data processed by these programs are stored on the recording medium.

The internal arrangement of the server 3 will now be described while referring to FIG. 4.

Figure 4:
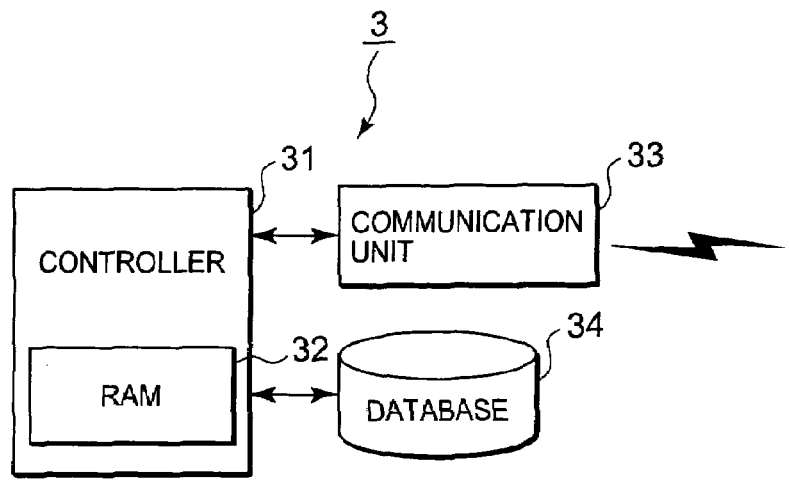
FIG. 4 is a diagram showing the internal arrangement of a server.

As is shown in FIG. 4, the server 3 comprises: a controller 31, a RAM 32, a communication unit 33 and the DB 34, all of which are interconnected by a bus.

In accordance with a request received from the image processing apparatus through the communication unit 33, the controller 31 obtains requested data from the DB 34 and transmits the data to the requesting source.

A request received through the communication unit 33 and data obtained from the DB 34 are temporarily stored in a predetermined work area in the RAM 32.

The communication unit 33 is an interface connectable to a transfer medium that is connected to a network, such as the Internet n1 or the LAN n2. The communication unit 33 is constituted by a modem or a terminal adaptor, and communicates with an external device across a communication line, such as a telephone line, an ISDN line, a wireless communication line, a special line or a CATV line.

The DB 34 is used to store data having a predefined form for the collective data management, and specifically, application data used for the updating of data by the image processing apparatus 2, i.e., update data are stored in a predetermined form.

Figure 5:
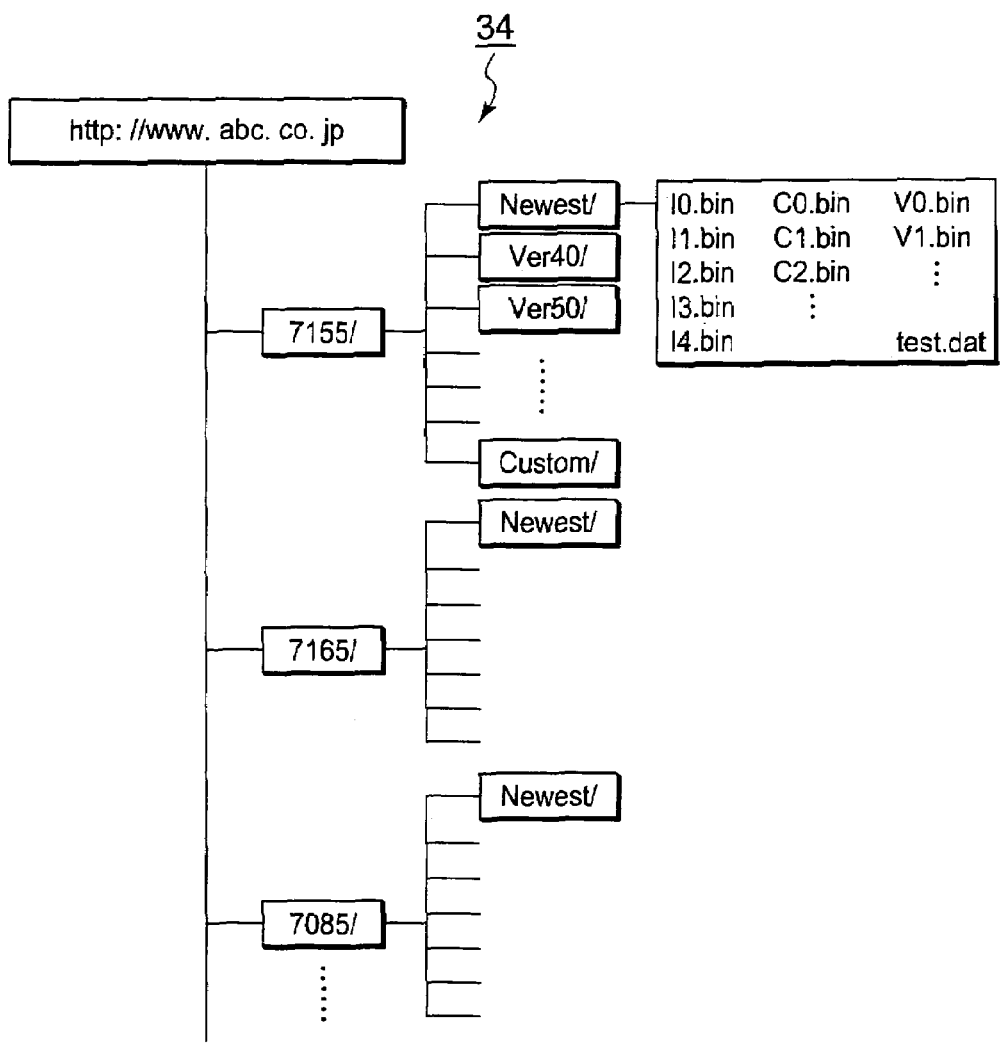
FIG. 5 is a diagram showing an example data structure for a DB.

FIG. 5 is a diagram showing an example data structure in the DB 34.

As is shown in FIG. 5, in the DB 34, a plurality of directories are prepared by employing a hierarchical directory structure, and update data are sorted and stored in these directories. First, sub-directories for the individual models of the image processing apparatuses 2 are included in the topmost directory of the DB 34, under model names such as "7155", "7165" and "7085", as directory names.

Furthermore, each sub-directory for the model includes directories corresponding to the individual versions, with upgraded version names "newest", "ver40" and "ver50" entered as the directory names. Then, each of the version directories includes file groups composed of update data, and application data such as "I0.bin", "I1.bin", ... "V1.bin" are stored in these files. In this embodiment, in each version directory, file name "I0.bin" is employed to store application data of the same type, e.g., a program for the operating panel. Further, in the "custom" directory, special firmware or setup data are stored that are consonant with the specifications of a user.

Therefore, when URL "http://www.abc.co.jp/7155/Newest/C1.bin", for example, that represents the storage location of update data to be requested is included in the update data request information transmitted by the image processing apparatus 2, a file of update data, "C1.bin", for the latest version is obtained from the "Newest" directory of a corresponding model "7155" directory. To obtain update data other than the latest version, the directory name of a desired version need only be designated in the request information for the corresponding update data to be acquired.

To obtain special firmware or setup data consonant with the specifications of a user, the "custom" directory and the program name need only be designated using the URL. Therefore, when the current image processing apparatus 2 of the user is to be exchanged for a new product, the setup data consonant with the specification user need only be stored in the "custom" directory, and after the products are exchanged, setup data consonant with the specification of the user need only be obtained from the "custom" directory, and the setup data for the new image processing apparatus updated. As a result, the new image processing apparatus can be employed in accordance with the same specifications as was the old image processing apparatus, and satisfactory usability is thereby ensured.

According to the directory structure for this embodiment, the "version" is placed under the "model name". However, one of the "model name", the "version" or the "data name" (e.g., a program name for an operating panel) may be employed as a file name, and the others may be located at higher and lower levels. For example, the "data name" may be placed under the "model name" and the "version" may be employed as a file name.

The operation for the first embodiment will now be described while referring to FIGS. 6 to 12.

Figure 6:
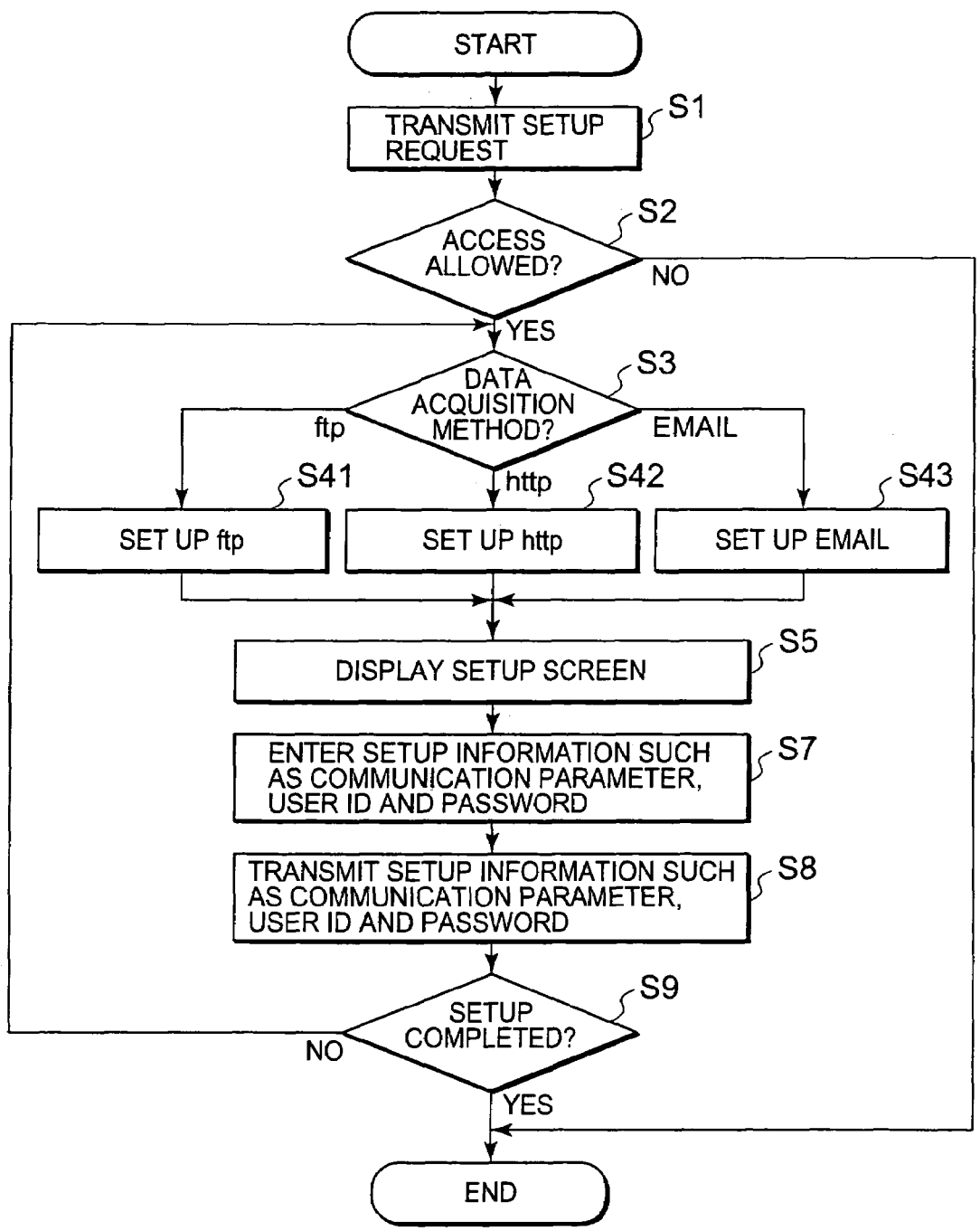
FIG. 6 is a flowchart for explaining the acquisition method, setup processing performed by the image processing apparatus.

FIG. 6 is a flowchart showing the acquisition method setup processing performed by the data processing apparatuses 1a and 1b. In the acquisition method setup processing, the acquisition method, whereby the image processing apparatus 2 accesses the server 3 and obtains, from the DB 34, the update data that are required to update the application data, is designated in advance.

This processing is performed when, for example, a person responsible for performing the maintenance proceeds to an actual area whereat an image processing apparatus is installed. Therefore, from the security viewpoint, it is preferable that the data processing apparatus 1a, connected to the LAN n2 provided in the organization, execute this processing. In the following explanation, the acquisition method is designated for execution through the data processing apparatus 1a; however, the same processing is performed to set the acquisition method through the data processing apparatus 1b. Further, the acquisition method can also be directly designated through the operating unit 22 of the image processing apparatus 2.

In the acquisition method setup processing shown in FIG. 6, first, the data processing apparatus 1a accesses the image processing apparatus 2 across the LAN n2. When an instruction to activate the browser is entered through the operating unit 12, the controller 11 activates the browser, and when an acquisition method setup request is entered by the person responsible for the maintenance on the screen displayed by the browser, the information for the setup request is transmitted to the image processing apparatus (step S1).

Then, the maintenance person enters a maintenance password and transmits the password to the image processing apparatus 2. The controller 11 determines whether the access is permitted by the image processing apparatus 2 (step S2) When the access is not permitted (NO at step S2), an error screen is displayed on the display unit 13, and the processing is thereafter terminated. When the access is permitted by the image processing apparatus 2 (YES at step S2), the type of acquisition method to be designated is determined based on the instruction entered through the operating unit 12 (step S3).

For the selection of an acquisition method type, a list of acquisition methods is displayed when the access is permitted, and one acquisition method on the list is selected by the maintenance person and is stored in the data storage unit 26 of the image processing apparatus 2. In this embodiment, there are three acquisition method choices, ftp (file transfer protocol, http (hyper-text protocol) and E-mail.

When ftp is selected as the data acquisition method, instruction information for the ftp setup is transmitted to the image processing apparatus 2 (step S41). Then, when ftp setup input screen data are received from the image processing apparatus 2, a corresponding ftp setup input screen (see FIG. 7A) is displayed on the display unit 13. When http is selected as the data acquisition method, instruction information for the http setup is transmitted to the image processing apparatus 2 (step S42). Then, when http setup input screen data are received from the image processing apparatus 2, a corresponding http setup input screen (see FIG. 7B) is displayed on the display unit 13. And when E-mail is selected as the data acquisition method, instruction information for an E-mail setup is transmitted to the image processing apparatus 2 (step S43), and when E-mail setup input screen data are received from the image processing apparatus 2, a corresponding E-mail setup input screen (see FIG. 7C) is displayed on the display unit 13.

Example setup input screens displayed on the display unit 13 of the data processing apparatus 1a will now be explained while referring to FIGS. 7A to 7C.

FIG. 7A is a diagram showing an ftp setup input screen 131. The ftp setup input screen 131 includes: a dialogue box a1 for entering a server address for accessing the server 3 including the DB 34; dialogue boxes a2 and a3 for respectively entering a user ID and a password, in order to authenticate the log-in at the server 3; and dialogue boxes a4 and a5 for respectively entering a firewall IP address and a port, in order to pass through the firewall FW and to access the Internet n1.

FIG. 7B is a diagram showing an http setup input screen 132. As well as in FIG. 7A, the http setup input screen 132 includes: a dialogue box a1 for entering the server address of the server 3 for accessing the server 3; dialogue boxes a2 and a3 for respectively entering a user ID and a password in order to authenticate the log-in at the server 3; and dialogue boxes a4 and a5 for respectively entering a firewall IP address and a port in order to pass through the firewall FW and to access the Internet n1.

FIG. 7C is a diagram showing an E-mail setup input screen 133. The E-mail setup input screen 133 includes: a dialogue box b1 for entering the address of the E-mail-server M; dialogue boxes b2 and b3 for respectively entering a user ID and a password in order to authenticate the log-in at the E-mail server M; and a dialogue box b4 for entering the E-mail address for the image processing apparatus 2.

Therefore, the maintenance person need only enter, in the dialogue boxes on one of the setup input screens 131 to 133, corresponding setup information, such as the communication parameters that are required for designating the data acquisition method, so that an acquisition method can be designated through the browser.

Referring again to FIG. 6, when a setup condition, a user ID and a password are entered at one of the setup input screens that is displayed on the display unit 13 at step S5 (step S7), and when a transmission instruction is entered through the operating unit 12, the input information for the communication parameters, the user ID and the password are transmitted, as the setup information for the selected acquisition method, through the communication unit 14 to the image processing apparatus 2 (step S8). The controller 11 performs and examination to determine whether a setup end notification has been received from the image processing apparatus 2, and determines whether the setup has been completed (step S9).

When the setup end notification is received, the controller 11 ascertains that the setup has been completed (YES at step S9), and the processing is thereafter terminated. When an error notification is received, or when the setup end notification is not received after a predetermined period of time has elapsed, the controller 11 ascertains that the setup has not yet been completed (NO at step S9) Program control then returns to step s3, and the acquisition method is again selected, and the processes at steps S3 to S8 are repeated.

In the above explanation, the browser of the data processing apparatus 1 has been employed to designate the acquisition method; however, the setup process is not limited to this, and the operating unit 22 of the image processing apparatus 2 may be employed to perform the same setup.

The data updating instruction-processing performed by the data processing apparatus 1a or 1b or the image processing apparatus 2 will now be described. In the data updating instruction processing, an instruction for updating application data is issued from by data processing apparatus 1a or 1b to the image processing apparatus 2 through the browser or by using E-mail, or is entered directly using the operating unit 22 of the image processing apparatus 2.

In this embodiment, the data processing apparatus 1a connected to the image processing apparatus 2 across the LAN n2 can access the image processing apparatus 2 according to ftp or http or by using E-mail. On the other hand, it is preferable that the data processing apparatus 1b, connected to the image processing apparatus 2 across the Internet n1, employ E-mail to access the image processing apparatus 2 so as to maintain the security of the LAN n2.

FIG. 8 is a flowchart showing the data updating instruction processing.

In the data updating instruction processing in FIG. 8, first, a method for instructing the updating of application data is selected from-among an instruction method that uses E-mail, an instruction method that uses a browser and an instruction method that uses the operating unit 22 of the image processing apparatus 2 (step S21).

First, an explanation will be given for the processing performed when the updating instruction method that uses E-mail is selected by the maintenance person, i.e., the processing performed by the data processing apparatus 1a or 1b. For the following explanation, the data processing apparatus 1a is employed; however, the same processing can be performed using the data processing apparatus 1b.

When the updating instruction method that uses E-mail is selected (E-mail at step S21) an E-mail software program is activated by the data processing apparatus 1a, and an E-mail instructing the updating of application data is created in accordance with the entries by the operating unit 12 (step S22). This instruction E-mail includes a command (instruction) having an executable form for the image processing apparatus 2, and upon receiving this E-mail, the image processing apparatus 2 reads and executes a predetermined program in accordance with the command included in the instruction E-mail, and then performs the individual processes.

Figure 9A:
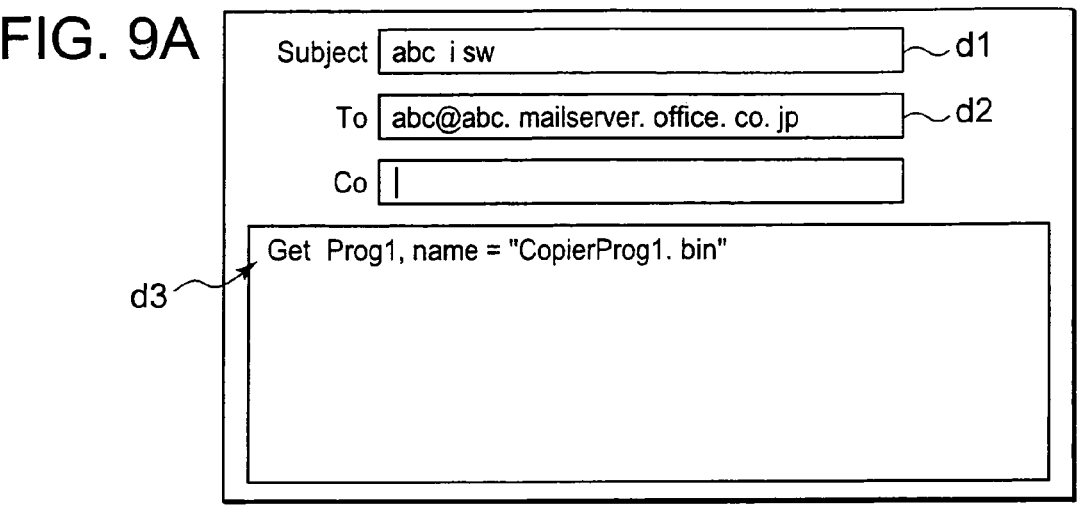
FIG. 9A is a diagram showing an example instruction E-mail created by the data processing apparatus.

FIG. 9A is a diagram showing an example instruction E-mail created by the maintenance person. As is shown in FIG. 9a, the user ID and the password of the maintenance person who manipulates the data processing apparatus 1a are entered in a dialogue box d1 "Subject", and thE-mail address for the image processing apparatus 2 at the destination is entered in a dialogue box d2 "To". Furthermore, in the text of the E-mail, Get Prog1, name="CopierProg1.bin" is entered as a command d3, executable by the image processing apparatus 2, with "Prog1" being used to represent the type of application data to be updated, and instructing the acquisition of update data having the file name "CopierProg1.bin".

When the instruction E-mail is created and an instruction to transmit this E-mail is entered, the instruction E-mail is transmitted through thE-mail server M to the image processing apparatus 2 (step S23). After the instruction E-mail has been transmitted, and when a rewrite start notification E-mail has been received from the image processing apparatus 2, indicating that the updating of application data has been started (step S24), the notification E-mail is displayed on the display unit 13.

Figure 9B:
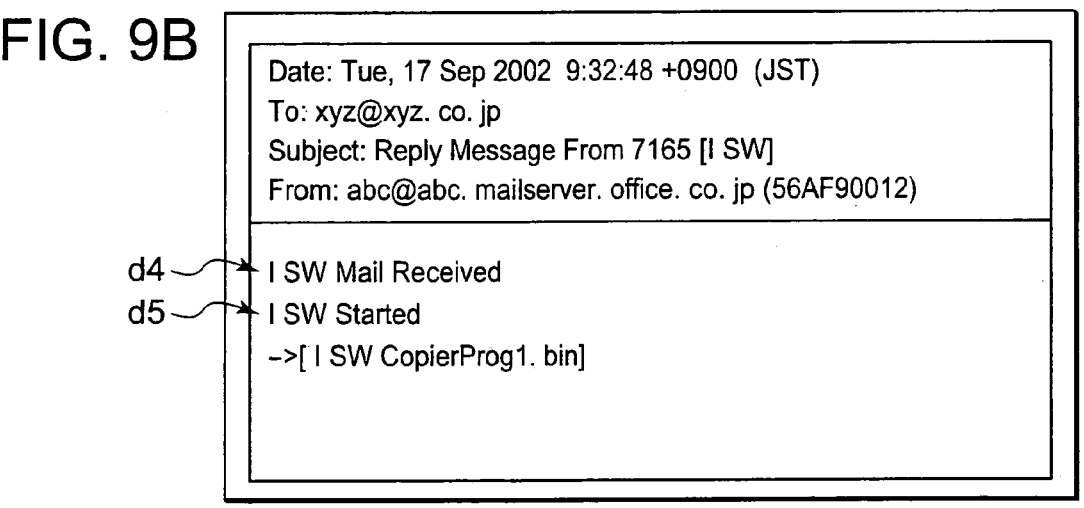
FIG. 9B is a diagram showing an example rewriting start notification E-mail created by the image processing apparatus.

FIG. 9B is a diagram showing an example notification E-mail indicating the rewriting start. As is shown in FIG. 9B, the rewrite start notification E-mail includes: a message d4, "Mail Received", indicating the instruction E-mail has been normally received; and a message d5, "Command[Get Prog1 . . . ]started", indicating that the firmware rewrite command included in the instruction mail has been started.

Next, when a notification E-mail indicating the rewriting has been completed is received from the image processing apparatus 2 (step S25), it is assumed that the application data has been updated by the image processing apparatus 2, and the processing is thereafter terminated.

Figure 9C:
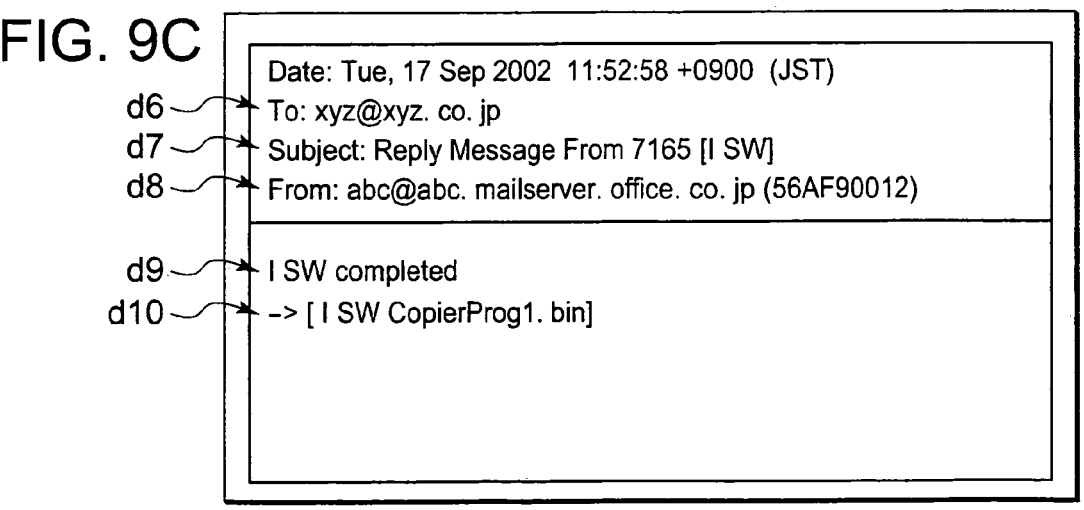
FIG. 9C is a diagram showing an example rewriting end notification E-mail created by the image processing apparatus.

FIG. 9C is a diagram showing an example rewrite end notification E-mail. As is shown in the rewrite end notification E-mail in FIG. 9C, thE-mail address of the data processing apparatus 1a at the destination is shown in a dialogue box d6, "To", and "Reply Message From 7165" is shown in a dialogue box d7, "Subject", indicating a return message has been received from the image processing apparatus 2 having the model name "7165". ThE-mail address for the image processing apparatus 2 is shown in a dialogue box d8, "From", and in the E-mail text, a message d10, "ISW completed", is shown, indicating that the execution of a command d9, "ISW CopierProg1.bin", included in the instruction E-mail, has been normally completed.

When the rewrite end notification is not received after a predetermined period of time has elapsed, or when the rewrite error notification E-mail is received from the image processing apparatus 2, it is assumed that the updating of the application data has failed, and an error notification E-mail (not shown) is displayed on the display unit 13. The error notification E-mail includes a message that the updating of application data has failed and an error code indicating the cause.

An explanation will now be given for the processing performed when the instruction method using the browser is selected by the maintenance person, i.e., the processing performed by the data processing apparatus 1a or 1b. In the following explanation, the data processing apparatus 1a is employed to perform the processing; however, the data processing apparatus 1b can also be used to perform the same processing.

When the instruction method using the browser is selected to update application data (browser at step S21), the browser is activated by the data processing apparatus 1a and accesses a web page for remote control, so that the operation of the image processing apparatus 2 can be designated (step S26). This web page is run by the web server function of the image processing apparatus 2; however, the web page may be operated by the server 3 or by another management server.

Figure 10A:
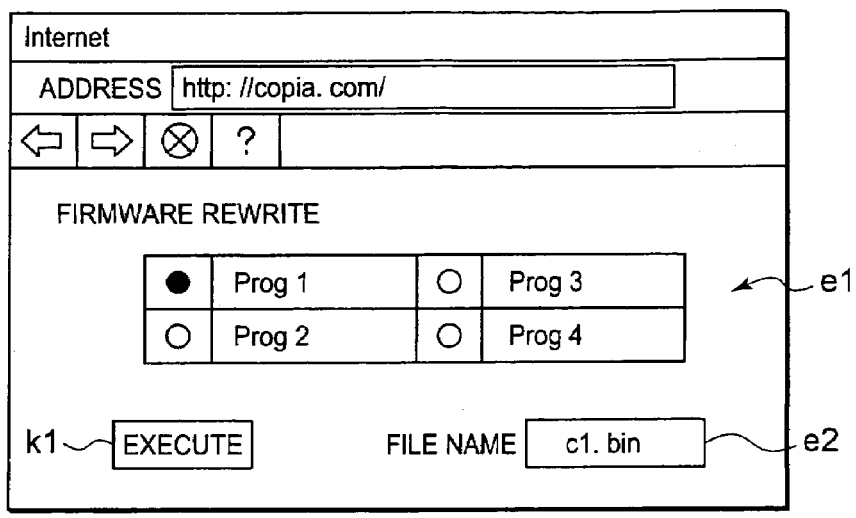
FIG. 10A is a diagram showing an example rewrite screen displayed by the data processing apparatus.
Figure 10B:
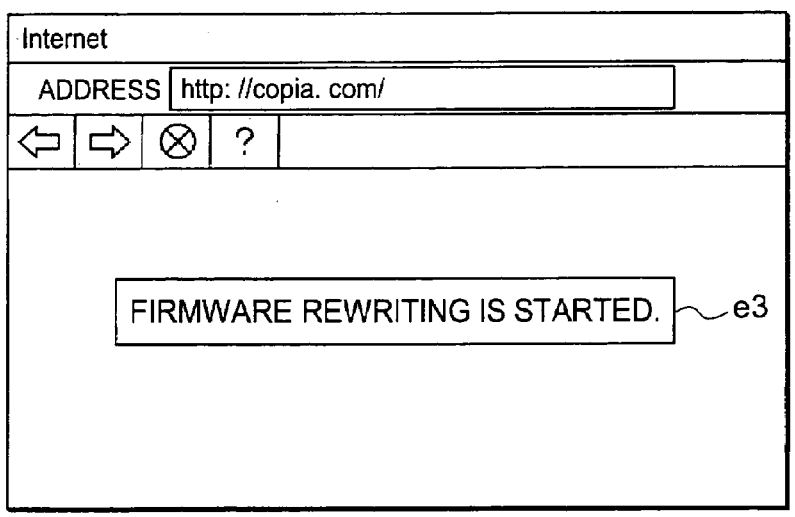
FIG. 10B is a diagram showing an example rewrite start notification screen displayed by the data processing apparatus.
Figure 10C:
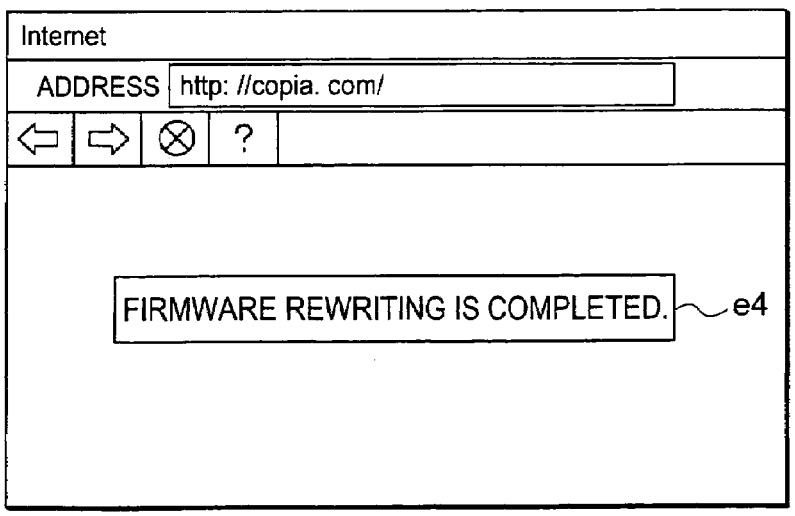
FIG. 10C is a diagram showing an example rewrite end notification screen displayed by the data processing apparatus.

Example web pages that are accessed by the browser are shown in FIGS. 10A to 10C. A rewrite screen is displayed on each web page for the entry of instruction information concerning the updating of application data.

For example, for firmware rewriting, as is shown in FIG. 10A, selection columns e1 for selecting the application data type to be updated and Prog1 to Prog4 are displayed, and when an application data type is selected, a file corresponding to the selected type is automatically searched for by the image processing apparatus 2, and the obtained file name is displayed in a file name input area e2. Further, an execution key k1 is displayed on the lower portion of the screen to instruct the start of the updating of the selected application data.

When, on the web page, the maintenance person selects application data to be updated, enters instruction information concerning the updating of data (step S27) and depresses the execution key k1, and the input instruction information is transmitted to the image processing apparatus 2 (step S28). After the instruction information has been transmitted, and when rewrite start screen data have been received to notify that the updating of application data has been started, based on the instruction information (step S29), a corresponding rewrite start screen is displayed on the display unit 13.

An example rewrite start notification screen is shown in FIG. 10B. As is shown in FIG. 10B, a message e3, indicating that the rewriting of the firmware designated by the instruction information has been started, is displayed on the rewrite start notification screen.

Following this, when rewrite end screen data are received from the image processing apparatus 2 as notification that the rewriting has been completed (step S30), it is assumed that the updating of the application data has been completed by the image processing apparatus 2, and a rewrite end screen is displayed on the display unit 13. The processing is thereafter terminated.

An example rewrite end screen is shown in FIG. 10C. As is shown in FIG. 10C, a message e4 is displayed on the rewrite end screen as notification that the firmware rewriting has been completed.

An explanation will now be given for the processing performed when the instruction method that uses the operating unit 22 of the image processing apparatus 2 is selected by the maintenance person, i.e., the processing performed by the image processing apparatus 2.

When the updating instruction method that uses the operating unit 22 of the image processing apparatus 2 is selected (operating unit at step S21), an operating menu is displayed on the display unit 23 of the image processing apparatus 2. And when a firmware rewriting instruction on the operating menu is selected by using the operating unit 22, a firmware rewrite screen is displayed on the display unit 23 (step S31).

Figure 11A:
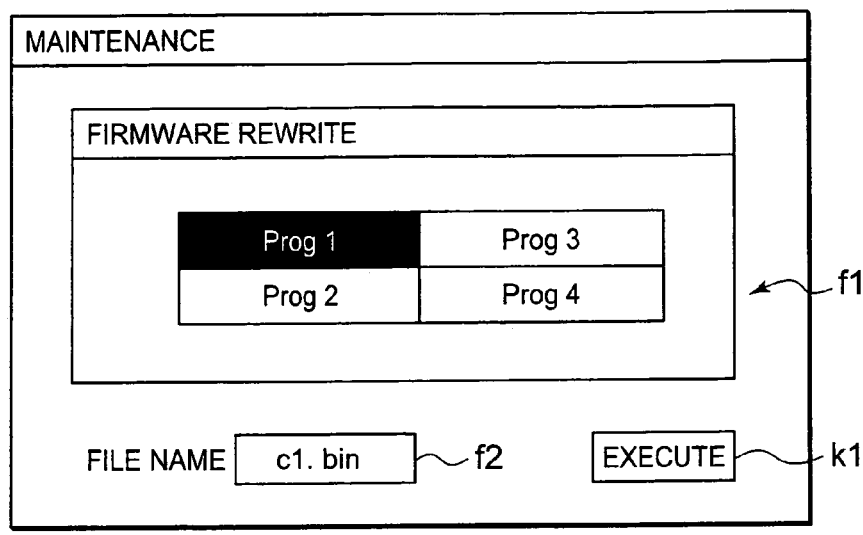
FIG. 11A is a diagram showing an example rewrite screen displayed by the image processing apparatus.

An example firmware rewrite screen is shown in FIG. 11A. As is shown in FIG. 11A, selection columns f1, for "Prog1" to "Prog4", indicating the types of application data that are to be updated, are displayed on the rewrite screen, and when, as well as for the browser, an application data type is selected, a file name corresponding to the selected application data type is automatically searched for by the image processing apparatus 2 and is displayed in a file name input area f2. Further, an execution key k1 is displayed on the lower portion of the screen to instruct the start of the updating for the selected application data.

When the maintenance person selects the type of application data to be updated and enters instruction information concerning the updating (step S32), and when he or she depresses the execution key k1 (step S33), a message is displayed on the display unit 23 to provide notification that the updating of the application data has been started based on the instruction information (step S34).

Figure 11B:
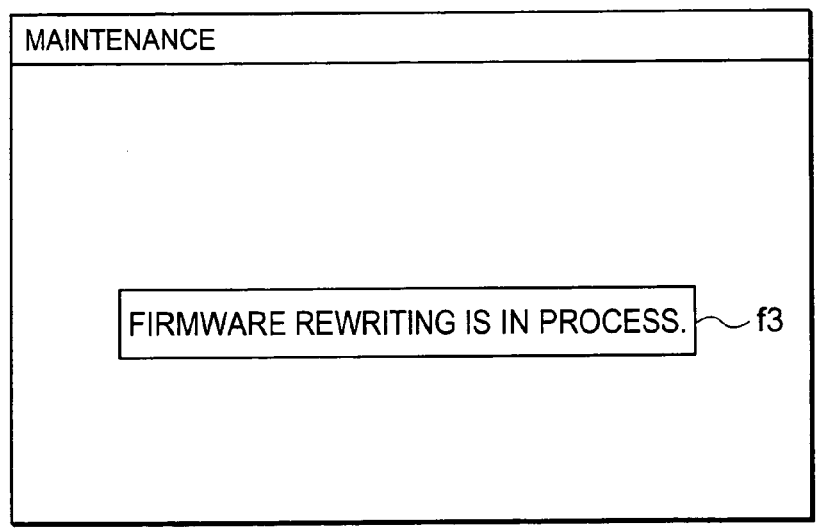
FIG. 11B is a diagram showing an example rewrite start notification screen displayed by the image processing apparatus.

An example update start notification message is shown in FIG. 11B. As is shown in FIG. 11B, a message f3 is displayed on the operating screen of the operating unit 23 to provide notification that the firmware rewriting instructed based on the instruction information has been started.

When the image processing apparatus 2 has updated the application data, a rewrite end screen is displayed on the display unit 23 as notification that the firmware rewriting has been completed (step S35). The processing is thereafter terminated.

Figure 11C:
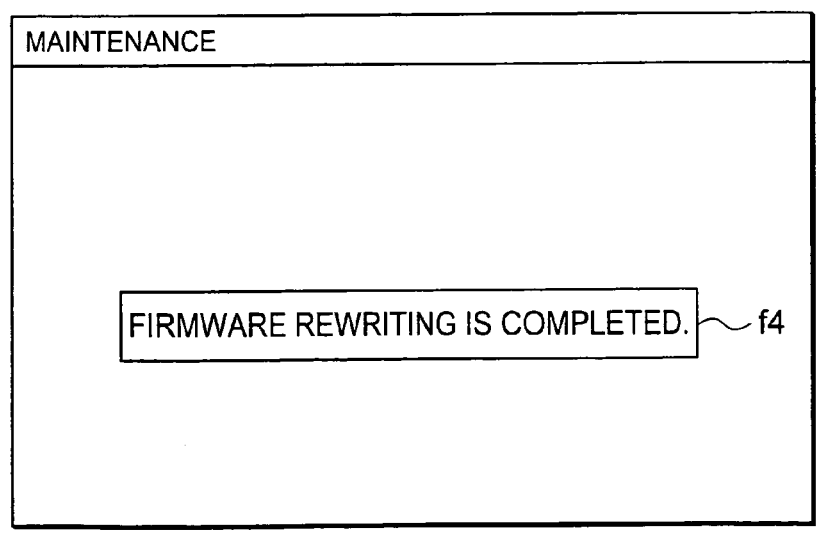
FIG. 11C is a diagram showing an example rewrite end notification screen displayed by the image processing apparatus.

An example rewrite end screen is shown in FIG. 11C. As is shown in FIG. 11C, a message f4 is displayed on the rewrite end screen to provide notification that the firmware rewriting has been completed.

The data updating processing performed by the image processing apparatus 2 will now be explained while referring to FIG. 12. In this data updating processing, in accordance with an instruction E-mail or instruction information instructing the updating of application data, update data required for updating application data are obtained and employed to update the application data. In the following explanation, the instruction E-mail or the instruction information is employed to update the firmware rewriting and updating. However, the same processing can be performed for another type of application data.

Figure 12:
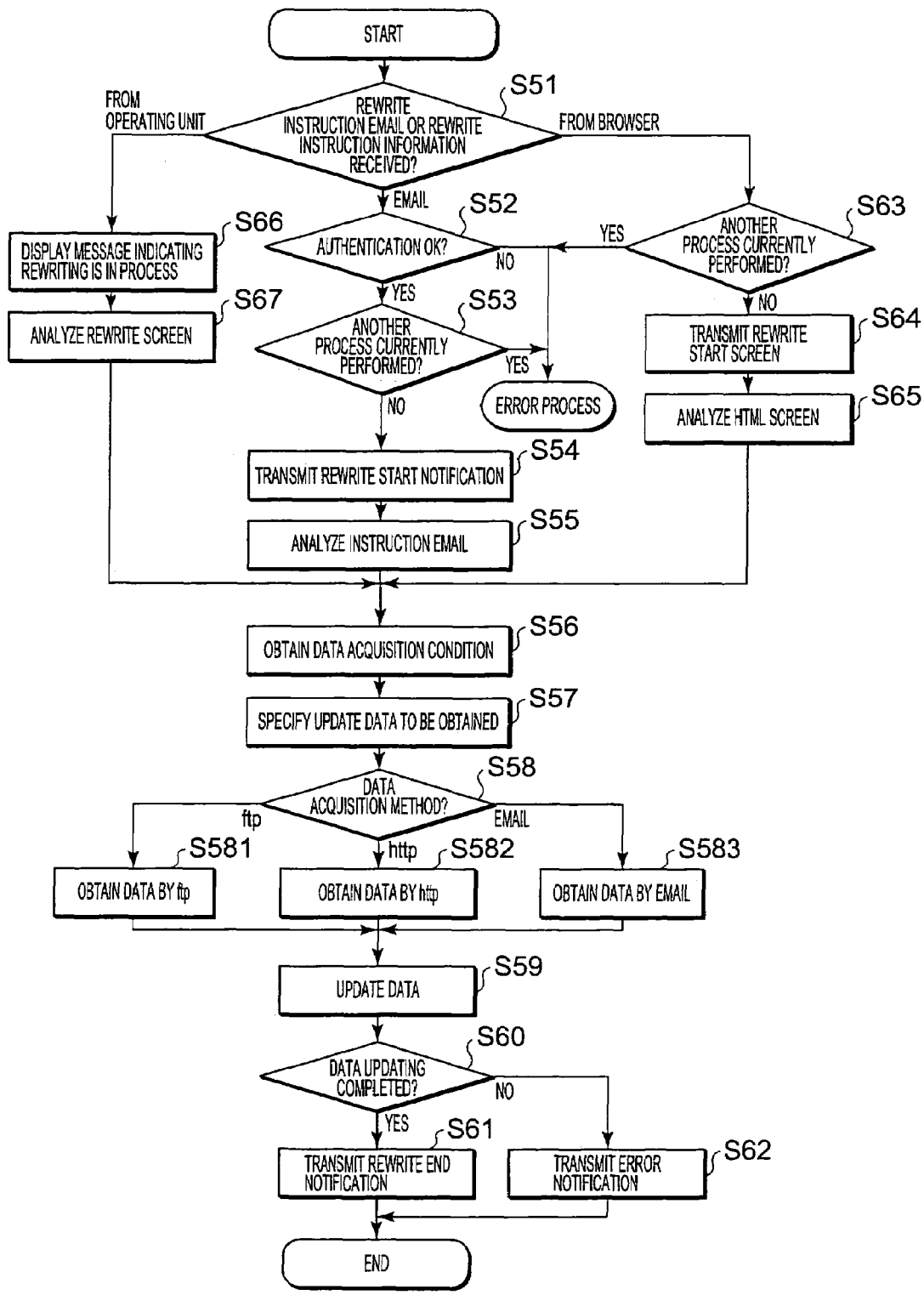
FIG. 12 is a flowchart for explaining the data updating processing performed by the image processing apparatus.

In the data updating processing in FIG. 12, a check is performed to determine an instruction method according to which the rewrite instruction E-mail or the rewrite instruction information has been entered in the image processing apparatus 2 (step S51). The instruction method is specifically identified, i.e., the instruction method using an E-mail was employed to receive the rewrite instruction mail from the data processing apparatus 1a or 1b through the communication unit 24, the instruction method using the browser was employed to receive the rewrite instruction information from the data processing apparatus 1a or 1b through the browser, or the instruction method using the operating unit 22 of the image processing apparatus 2 was employed to enter the rewrite instruction information at the operating unit 22.

First, an explanation will be given for a case wherein a rewrite instruction E-mail is received by using the instruction method that uses E-mail. At step S51, when a rewrite instruction E-mail is received through the communication unit 24 (E-mail at step S51), the maintenance person is verified based on the user ID and the password included in the instruction E-mail, and whether the verification has been successful is determined (step S52).

When the verification has failed (NO at step S52) an error process is performed and an error notification E-mail is transmitted to the data processing apparatus 1a or 1b that is the transmission source of the rewrite instruction E-mail. In the data processing apparatus 1a or 1b, a results screen relative to the rewrite instruction is displayed, i.e., in this embodiment, since the user verification has failed the error notification mail indicating the rewriting has been halted is presented.

When the verification has been successful (YES at step S52), a check is performed to determine whether the image processing apparatus 2 is currently performing another process, such as printing (step S53). When the image processing apparatus 2 is currently performing another process (YES at step S53), program control waits until this process has been terminated, or an error process is performed to transmit an error notification E-mail to the data processing apparatus 1a or 1b that is the transmission source of the rewrite instruction E-mail. In the data processing apparatus 1a or 1b, the error notification E-mail is displayed to provide notification that the rewriting has been halted because the image processing apparatus 2 is performing another process.

When the image processing apparatus 2 is not currently performing any process (NO at step S53), a notification E-mail indicating that the rewriting has been started is created and transmitted to the data processing apparatus 1a or 1b (step S54). Then, the received instruction E-mail is analyzed, and a command included in the instruction E-mail is obtained (step S55).

Thereafter, a data acquisition method, e.g., the type of update data to be obtained and the file name and the program name therefore, are extracted from the obtained command (step S56), and the update data to be obtained are specified based oh the data acquisition condition, or, at the least, one of the identification sets, such as the serial number of the image processing apparatus 2, the product name, the model name, the product version, the model version or the version of the application data, all of which are stored in the data storage unit 26 (step S57). For example, assuming that the acquisition of the application data type "Prog1" is the data acquisition condition, and that "7155" is the model name for the image processing apparatus 2, and "Ver40" is the version of the application data, "Prog1", that has currently been designated in the image processing apparatus 2, the update data for file name "c1.bin", which corresponds to "Prog1", are obtained from the directory of the latest version "Newest" located under the directory "7155" in the data base 34 of the server 3.

When the data acquisition condition is not obtained from the command, and when only the identification information for the image processing apparatus 2 is employed to specify the update data to be obtained, a corresponding directory is determined in accordance with the serial number, the product name, the model name and the model version of the image processing apparatus 2, and the default data for the latest version are obtained from the pertinent directory.

Next, the setup information pre-designated in the data storage unit 26 for the update data acquisition method is employed to determine which method, ftp, http or E-mail, is to be employed to obtain update data (step S58). When the setup information for the ftp acquisition method is stored in the data storage unit 26, to obtain update data (ftp at step S58), the server 3 is accessed through the communication unit 24, based on the ftp setup information that is stored in the data storage unit 26, request information is transmitted to request the update data that are specified at step S57, and the update data are obtained from the DB 34 of the server 3 (step S581). At this time, the URL represents the storage location for the specified update data that may be included in the request information, or the file name of the specified update data may be so designated.

When the setup information for the http acquisition method is stored in the data storage unit 26, to obtain update data (http at step S58), the server 3 is accessed through the communication unit 24, based on the http setup information that is stored in the data storage unit 26, request information is transmitted to request the update data specified at step S57, and the update data are obtained from the DB 34 of the server 3 (step S582).

When the setup information for the E-mail acquisition method is stored in the data storage unit 26, to obtain the update data (E-mail at step S58), a request E-mail is created, to request the update data specified at step S57, and is transmitted to the destination at thE-mail address for the server 3 that is designated in the E-mail setup information stored in the data storage unit 26. Thereafter, an E-mail, with which an update is enclosed, is received from the server 3, and the update data are obtained (step S583).

When the update data are obtained using one of these acquisition methods, the firmware data stored in the data storage unit 26 are rewritten using the obtained update data (step S59). Then, a check is performed to determine whether the updating of the firmware data has been completed (step S60). When the data updating has been completed (YES at step S60), a rewrite end notification E-mail is created and is transmitted to the data processing apparatus 1, which is the transmission source of the rewrite instruction E-mail (step S61). After the notification E-mail has been transmitted, the reactivation is performed to validate the updating of the firmware data, and the data updating processing is thereafter terminated.

When the updating of the firmware data has not been completed due to the occurrence of an error (NO at step S60), an error notification E-mail is created and is transmitted to the data processing apparatus 1a, which is the transmission source of a rewrite end E-mail (step S62). The error notification E-mail is displayed on the data processing apparatus 1a or 1b, and this error notification E-mail includes the cause of the error, e.g., "rewriting is halted because the acquisition of the firmware data from the server has failed", "rewriting is halted because an abnormality has been found in the downloaded firmware data", or "firmware rewriting has failed". After the error notification E-mail has been transmitted, the processing is terminated.

An explanation will now be given for a case wherein the rewrite instruction information is received by the instruction method using the browser. When data are to be exchanged through the browser, the image processing apparatus 2 serves as a web server and is connected directly to the data processing apparatus 1a or 1b, so that, based the http protocol, the web page screen (HTML screen) is exchanged by the data processing apparatus 1a or 1b and the image processing apparatus 2.

When, at step S51, the data for a rewrite screen on which a rewrite instruction has bee entered are received from the data processing apparatus 1a or 1b through the browser (browser at step S51), a check is performed to determine whether the image processing apparatus 2 is currently performing another process (step S63). When the image processing apparatus 2 is performing another process (YES at step S63), program control waits until the current process has been terminated, or an error process is performed to transmit, to the data processing apparatus 1a, screen data for an error notification indicating that the rewriting has been halted because another process is currently being performed.

When the image processing apparatus 2 is not performing any process (NO at step S63), rewrite start screen data are transmitted through the notification unit 24 to the data processing apparatus 1a to provide notification for the rewriting start (step S64). Then, the rewrite screen (HTML screen) on which is displayed the instruction information related to the firmware updating, which is received from the data processing apparatus 1a through the browser, is analyzed (step S65) and the instruction information entered on the rewrite screen is obtained.

When the instruction information has been acquired through screen analysis, program control is shifted to step S56. Since the process following step S56 is the same as that for the update data acquisition method using E-mail, no detailed explanation will be given. Briefly, the data acquisition condition is obtained from the instruction information; the update data to be obtained from the server 3 are specified, based on the data acquisition condition or the identification information for the image processing apparatus 2; and the data updating is performed by obtaining the specified update data. After the data updating has been performed, the data for the updating end screen or the error screen are transmitted.

An explanation will now be given for a case wherein the rewrite instruction information is entered using the instruction method that employs the operating unit 22 of the image processing apparatus 2.

When, at step S51, the rewrite instruction information is entered through the operating unit 22 of the image processing apparatus 2 (operating unit at step S51), a message providing notification that the rewriting is currently being performed is displayed on the display unit 23 (step S66). Then, the rewrite screen on which the instruction information has been entered using the operating unit 22 is analyzed, and the instruction information on the rewrite screen is obtained (step S67).

After the instruction information is obtained, program control is shifted to step S56. Since the process following step S56 is the same as that for the acquisition method using an E-mail, no detailed explanation will be given. Briefly, the data acquisition condition is obtained from the instruction information; update data to be obtained from the server 3 are specified based on the data acquisition condition or the identification information for the image processing apparatus 2; and the data updating is performed by obtaining the update data. After the data updating is performed, the update end screen or the error screen is displayed on the display unit 23.

As is described above, according to the first embodiment, to update the application data of the image processing apparatus 2, the data processing apparatus 1*a* or 1*b* transmits an updating instruction E-mail to the image processing apparatus 2 through the Internet n1 or the LAN n2, or transmits the instruction information through the browser to the image processing apparatus 2. Upon receipt of the instruction mail or the instruction information, the image processing apparatus 2 obtains the update data to update the application data. Therefore, the maintenance person need not proceed to the location where the image processing apparatus 2 is installed, and can update the application data from a remote area.

Further, since the method for obtaining the update data from the server is pre-designated and is stored in the data storage unit 26, the image processing apparatus 2 can obtain the update data from the server 3 by using the acquisition method stored in the data storage unit 26. Therefore, since the maintenance person need not designate the acquisition method each time he or she issues the updating instruction to the image processing apparatus, the instruction operation is simplified. Especially, when there are a plurality of image processing apparatuses 2 for which the data updating is required, the acquisition method need not be designated for the models or versions of the individual image processing apparatuses, and for example, instruction E-mails need only be simultaneously transmitted to these apparatuses to instruct the data updating.

Therefore, the load imposed of the maintenance person can be reduced, and the job efficiency can be improved. Therefore, the system can be efficiently operated with a lower maintenance cost.

Furthermore, since one of the acquisition methods http, ftp or an E-mail that are prepared in advance can be selected by the image processing apparatus 2, the acquisition method appropriate for the operating mode of the image processing apparatus 2 can be designated.

In addition, since the data updating can be instructed by using an E-mail, or through the browser, or by using the operating unit 22 of the image processing apparatus 2, the instruction method can be selected in accordance with the maintenance job form.

To issue an updating instruction through the browser, the data processing apparatus 1*a* or 1*b* can employ the browser function to enter the instruction information on the web page screen for remote control. Since a general-purpose notebook PC or a PDA incorporating the browser function can be employed as the data processing apparatus 1*a* or 1*b*, a plurality of special tools need not be prepared for the models of the individual image processing apparatuses, and the maintenance cost can be saved. Furthermore, various information can be entered by the browser function based on the information displayed on the display unit 13, and through a simple operation, the data transfer instruction can be issued or data to be transferred can be entered and designated. Thus, the satisfactory operability is obtained.

When the data processing apparatus 1*b* issues an application data updating instruction through the Internet n1, and when a computer executable program is attached as a file, the entry to the local network may be restricted by a firewall provided at the entrance of the local network. However, in this embodiment, since the update data are obtained by the image processing apparatus 2, a file, such as a program, need not be attached to the updating instruction E-mail or the instruction information, so that the access to the local network is not rejected. In addition, since the image processing apparatus 2 accesses the server 3 from inside the local network and obtains the update data, the constant security level of the local network can be maintained, while the update data are received from outside.

Further, all the update data required to update the application data for the image processing apparatus 2 can be stored in the DB 34 of the server 3, and so long as the image processing apparatus 2 can be connected to the network, the apparatus 2 can access the server 3 from anywhere and obtain the update data. Furthermore, since the server 3 can collectively manage the update data, the data processing system can be efficiently operated by effectively using limited resources.

In addition, since the update data to be obtained are specified by the image processing apparatus 2 based on the data acquisition condition, such as the data type information included in the instruction E-mail or the instruction information, and the serial number, the product name, the model name, the model version and the application data version that are identification information for the image processing apparatus 2, the maintenance person need not set the update data in details, and the designated update data can be correctly obtained.

Before the data updating is started, the image processing apparatus 2 transmits the update start notification to the data processing apparatus 1*a* or 1*b*, and when the data updating is ended, transmits a updating end notification or an error notification to the data processing apparatus 1*a* or 1*b* to represent the updating results. Therefore, the maintenance person can understand the state of the data updating process performed by the image processing apparatus 2, and can quickly cope with a trouble that has occurred. Therefore, the degree of client satisfaction can be improved.

It should be noted that the first embodiment is merely an example for the image processing apparatus, the data processing apparatus, the server and the data processing system preferred to the present invention, and the configuration is not limited to this.

For example, in this embodiment, the data processing apparatus 1*a* is connected through the LAN n2, while the data processing apparatus 1*b* is connected through the Internet n1. However, the data processing apparatuses 1*a* and 1*b* may be connected through various other networks.

It is natural that the detailed arrangements and operations of the individual components of the data processing system 100 in the first embodiment can be appropriately modified without departing from the subject of the invention.

Second Embodiment

According to a second embodiment, in the processing for obtaining, from a server, update data required to update application data concerning the usage of an image processing apparatus, a condition for a validity term or a validity limit for obtaining update data or for updating application data is designated in updating instruction information. When the updating instruction information received by the image processing apparatus does not satisfy the condition for the validity term or the validity limit, the acquisition of update data or the updating of application data that is designated in the instruction information is inhibited. This example will now be described.

For the second embodiment, since the operation about the validity term or the validity limit is added to that for the first embodiment, and the other operation is the same as in the first embodiment, no further explanation for it may be given so long as there is no explanatory notice.

Since the configuration of an image processing apparatus, data processing apparatuses and a data processing system comprising these apparatuses is the same as that for the first embodiment, an explanation for this will be given while referring to FIG. 1.

Specifically, a data processing system 100 for the second embodiment comprises: data processing apparatuses 1a and 1b, an image processing apparatus 2 and a server 3. The image processing apparatus 2, the data processing apparatus 1b and the sever 3 are connected through the Internet n1 to access each other, while the image processing apparatus 2, the data processing apparatus 1a and an E-mail server M are connected through a LAN n2 that is a network provided in a limited area.

Since the server 3 and the E-mail server M are the same as those for the first embodiment, no explanation for them will be given, and only the data processing apparatuses 1a and 1b and the image processing apparatus 2 for this embodiment will be explained in detail.

First, the data processing apparatuses 1a and 1b will be explained.

Since the internal arrangement for the data processing apparatuses 1a and 1b is almost the same as that for the first embodiment in FIG. 2, the same reference numerals are employed to denote corresponding components, and only the different function sections will be explained. The data processing apparatus 1a or 1b comprises: a controller 11, an operating unit 12, a display unit 13, a communication unit 14, a RAM 15 and a storage unit 16.

The controller 11 opens, to the RAM 15, various system programs, data updating instruction programs (see FIG. 8) related to the present invention that are stored in the storage unit 16, and totally controls the processing in cooperation with these programs.

In the data updating instruction processing, upon receipt of an instruction entered through the operating unit 12, the controller 11 creates an instruction E-mail or generates instruction information to instruct the updating of application data for the image processing apparatus 2. At this time, a condition concerning the validity term or the validity limit to obtain the update data or to update the application data is included in the instruction E-mail or the instruction information. The instruction E-mail or the instruction information is transmitted through the communication unit 14.

The image processing apparatus 2 will now be described.

Since the internal arrangement of the image processing apparatus 2 is almost the same as that for the first embodiment in FIG. 3, the same numerals are employed to denote corresponding components, and only different function sections will now be described. The image processing apparatus 2 comprises: a controller 21, an operating unit 22, a display unit 23, a communication unit 24, a RAM 25, a data storage unit 26, a printing unit 27 and a storage unit 28.

The controller 21 opens, to the RAM 25, a system program and an E-mail processing program (see FIG. 13) related to the present invention, both of which are stored in the storage unit 28, and totally controls the processing in cooperation with these programs. As a result, a data acquisition unit, a data updating unit, a validity condition setup unit, an instruction error notification unit and an inhibiting unit can be provided.

In the E-mail processing, based on information that is included in an instruction E-mail or instruction information received by the image processing apparatus 2, and is related to a condition for a validity term or a validity limit, a validity term or a validity limit is designated for this instruction E-mail or instruction information. The controller 21 has a timer function using an internal clock. When application data are to be updated in accordance with the instruction E-mail or the instruction information, a check is performed to determine whether the validity term has expired or the validity limit is reached for the updating instruction. When the validity term has expired or the validity limit is reached, the updating instruction is regarded as invalid, and the acquisition of the update data or the updating of application data is inhibited. Then, an error notification mail is created, or error notification information is generated to notify that the updating process is not performed due to the expiration of the validity term or the validity limit. The error notification E-mail is transmitted through the communication unit 24 to the transmission source of the instruction E-mail or the instruction information, or the error notification information is displayed on the display unit 23.

The system program for the image processing apparatus 2 and the E-mail processing program related to the present invention are stored in the storage unit 28. Further, time difference information consonant with the location where the image processing apparatus 2 is installed is also stored in the storage unit 28. For example, when the image processing apparatus 2 is located in Japan, information of "+0900" is stored, indicating a time difference of nine hours in advance from the international standard time GMT.

The operation for the second embodiment will now be described while referring to FIG. 13 to FIGS. 16A and 16B.

First, the E-mail processing performed by the image processing apparatus 2 will be explained while referring to FIG. 13. In the E-mail processing, the application data are updated in accordance with an instruction E-mail in which a validity term is designated to update the application data. As the assumption for the explanation, an instruction E-mail for updating the application data for the image processing apparatus 2 is created by the data processing apparatus 1a, and is transmitted to the image processing apparatus 2 while the validity term of the instruction E-mail is designated. The same processing is performed when the instruction E-mail is transmitted by the data processing apparatus 1b.

In this embodiment, an explanation will be given for an example wherein the validity term is designated using the instruction E-mail instructing to update the application data. However, the data processing apparatus 1a or 1b may access a web page that the web server function of the image processing apparatus 2 provides for the data processing apparatus 1a or 1b for the remote control of the image processing apparatus 2, and the validity term may be designated on this web page. Or, the validity term may be entered directly using the operating unit 22 of the image processing apparatus 2.

Figure 13:
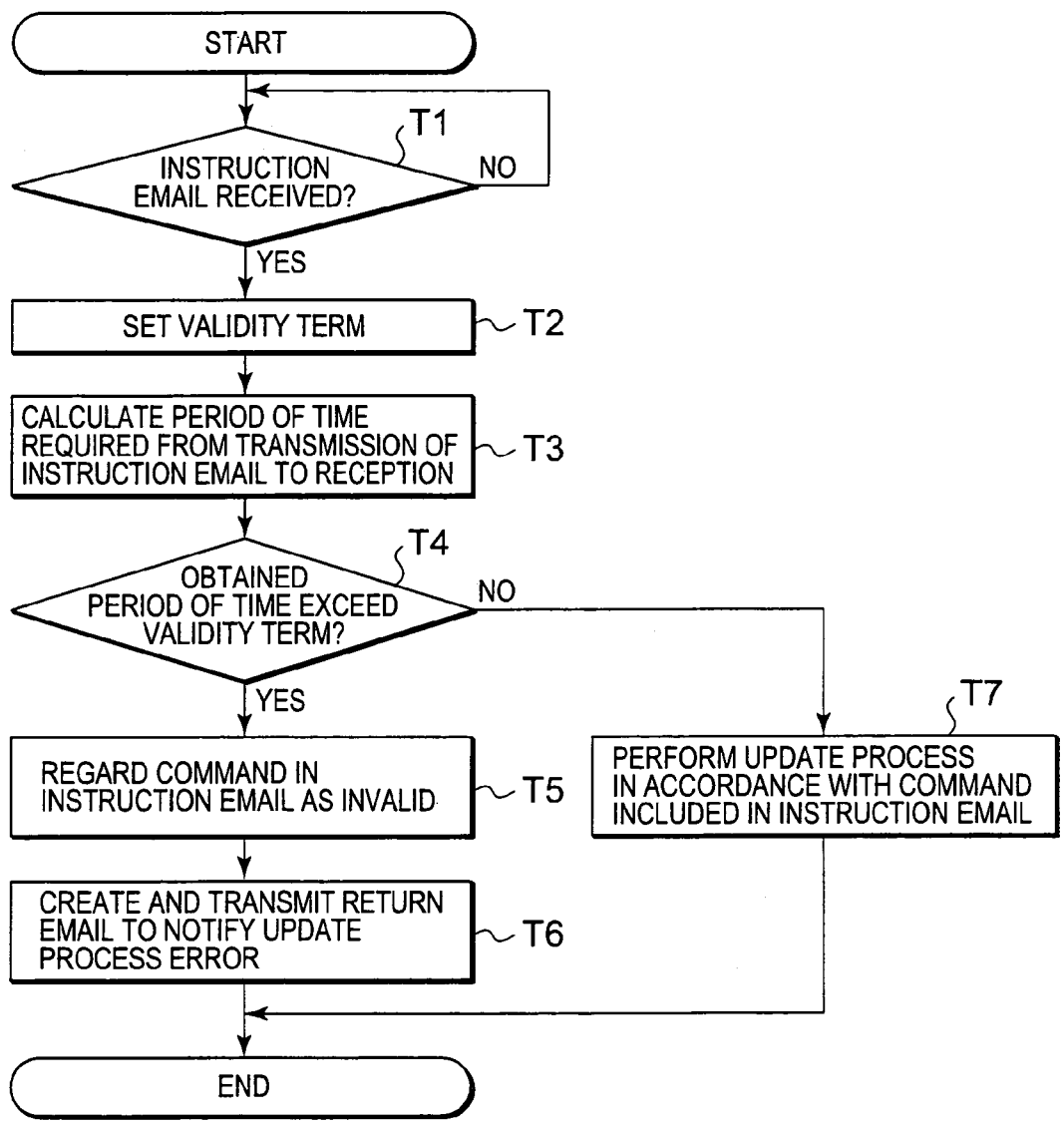
FIG. 13 is a flowchart for explaining the E-mail processing performed by an image processing apparatus according to a second embodiment of the present invention.

In the E-mail processing in FIG. 13, first, a check is performed to determine whether an instruction E-mail to update application data is received from the data processing apparatus 1 through the Internet n1 or the LAN n2 (step T1). When the instruction E-mail is received (YES at step T1), the instruction E-mail is analyzed, and a command included in this E-mail is obtained.

Figure 14:
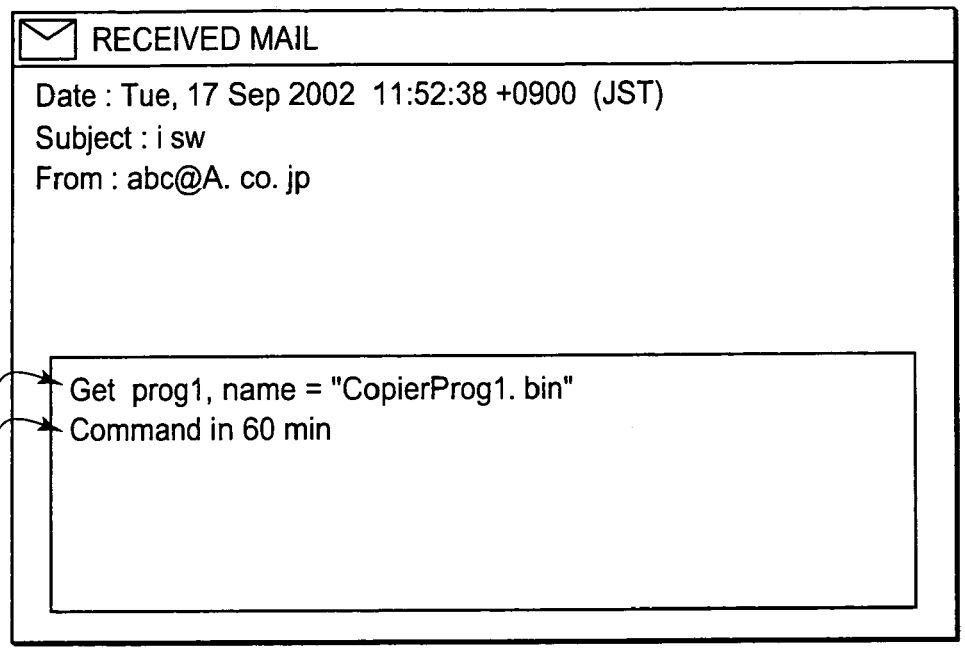
FIG. 14 is a diagram showing an example instruction E-mail for which a validity term is designated.

An example instruction E-mail which includes a designated validity term is shown in FIG. 14. As is shown in FIG. 14, the instruction E-mail includes: a command g1, Get prog1, name="CopeProg1.bin", that instructs to acquire, from the server 3, update data having the file name "CopieProg1" and the update data type of "prog1", and to perform the updating process; and a condition g2, related to a validity term "Command in 60 min" that represents the validity term of the command is within 60 minutes after the instruction E-mail is transmitted.

When the command related to the validity term is included in the obtained commands, the information for the validity term is stored in the data storage unit 26, and the validity term for the acquisition of update data or the updating of application data, which is instructed according to the instruction E-mail, is set up (step T2).

When the validity term is set up, a period of time required since the instruction E-mail was transmitted from the transmission source until the E-mail was received by the image processing apparatus 2 is calculated (step T3). For this calculation, the time of the transmission of the instruction E-mail and a time difference at the location of the transmission source are read from the header of the instruction E-mail. In the example in FIG. 14, transmission time "11:52:38, Sep. 17, 2002" and the time difference "+nine hours" at the transmission location are read from the header of the instruction E-mail. Then, the information for the reception time of the instruction E-mail that is counted by the timer function of the controller 22 is obtained, the time difference at the reception location, i.e., the time difference information at the location where the image processing apparatus 2 is installed, is read from the storage unit 28. The transmission time, the reception time, the time difference at the transmission location and the time difference at the reception location are employed to calculate the period of time required from the transmission of the instruction E-mail to the reception of this E-mail.

When the required period of time is calculated, the information for the validity term included in the instruction E-mail is read from the data storage unit 26, and a check is performed to determine whether the required period of time exceeds the validity term (step T4). For example, when the obtained period of time is 90 minutes and the validity term read from the data storage unit 26 is 60 minutes, it is ascertained that the period of time exceeds the validity term (YES at step T4). Then, the command that is included in the instruction E-mail and is related to the acquisition of update data or the updating of application data is regarded as invalid (step T5), and the acquisition of update data or the updating of application data is inhibited.

Following this, a return E-mail notifying that the error has occurred in the updating process is created, and is transmitted to the data processing apparatus 1a that is the transmission source of the instruction E-mail.

Figure 15:
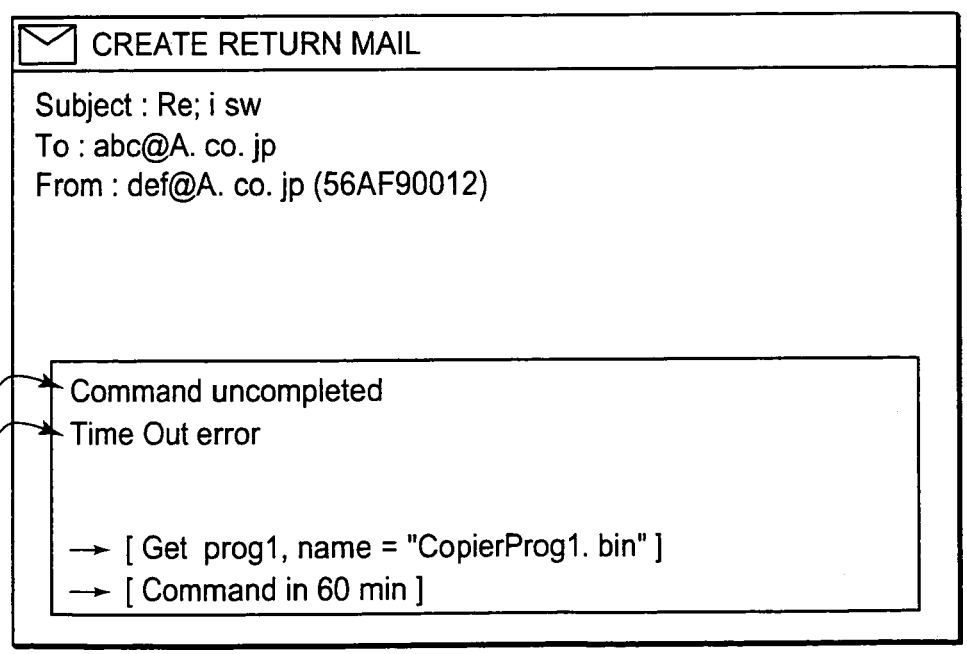
FIG. 15 is a diagram showing an example return E-mail indicating that the instruction E-mail has been invalidated because the validity term has expired.

An example return E-mail is shown in FIG. 15. As is shown in FIG. 15, the return mail includes: a message g3 "Command uncompleted" indicating that, due to an error, the updating process in accordance with the command was disabled; and a message g4 "Time Out error" indicating the cause that the validity term has expired.

When the required period of time calculated at step T3 is 30 minutes and the validity term stored in the data storage unit 26 is 60 minutes, it is assumed that the validity term for the instruction E-mail does not expire (NO at step T4), the updating process is performed in accordance with the command included in the instruction E-mail to acquire the update data or to update the application data. That is, the update data obtained from the server 3 are specified based on the data acquisition condition designated by the command of the instruction E-mail, or the identification information for the image processing apparatus 2 that is stored in the data storage unit 26. Then, the specified update data are obtained from the DB 34 of the server 3, and the application data are updated.

When the application data updating process is completed, a return mail indicating that the updating process is completed is transmitted to the data processing apparatus 1a that is the transmission source of the instruction E-mail. The processing is thereafter terminated.

As is described above, the validity term for the instruction E-mail is set up based on the validity term command included in a received instruction E-mail. When the period of time required from the transmission of the instruction E-mail to the reception of this mail exceeds the validity term, the command included in the instruction E-mail as to the acquisition of update data or the updating of application data is regarded as invalid, and the acquisition of update data or the updating of application data is inhibited. When the required period of time is within the validity term, the updating process is performed in accordance with the command included in the instruction E-mail. Therefore, the execution of the updating process in accordance with an old instruction E-mail for which the validity term has expired can be prevented. Thus, the updating process in consonance with the purpose of the maintenance person can be performed.

Further, when the command included in the instruction E-mail as for the acquisition of update data or the updating of application data is regarded as invalid, the return mail indicating that the updating process was not performed is created and transmitted to the data processing apparatus 1a that is the transmission source. Therefore, the maintenance person who instructed the updating process using the instruction E-mail can understand that the updating process was not normally performed because the validity term has expired.

The second embodiment is merely an example for the data processing apparatuses 1a and 1b, the image processing apparatus 2 and the data processing system 100 according to the invention, and the operation is not limited to this.

For example, in this embodiment, the validity term has been set up, e.g., within 60 minutes from the transmission of the instruction E-mail. The validity term condition is not limited to this. The date and time may be designated as a validity limit condition, e.g., when the updating process was not performed in accordance with the command of the instruction E-mail by 12:52, Sep. 17, 2002, this command is regarded as invalid.

Figure 16A:
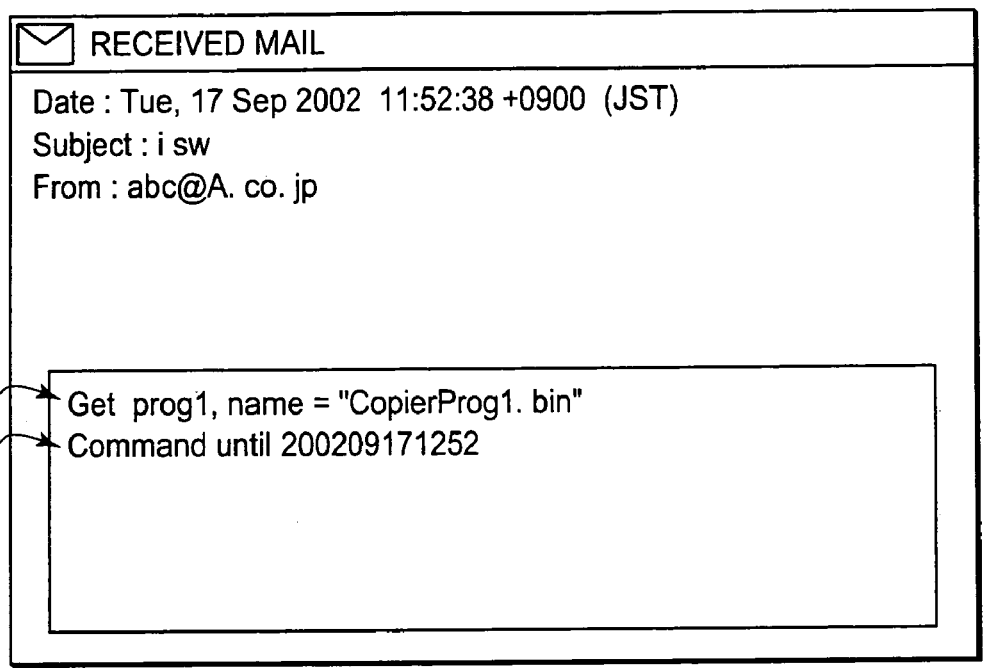
FIG. 16A is a diagram showing an example instruction E-mail for which the validity limit has been designated.
Figure 16B:
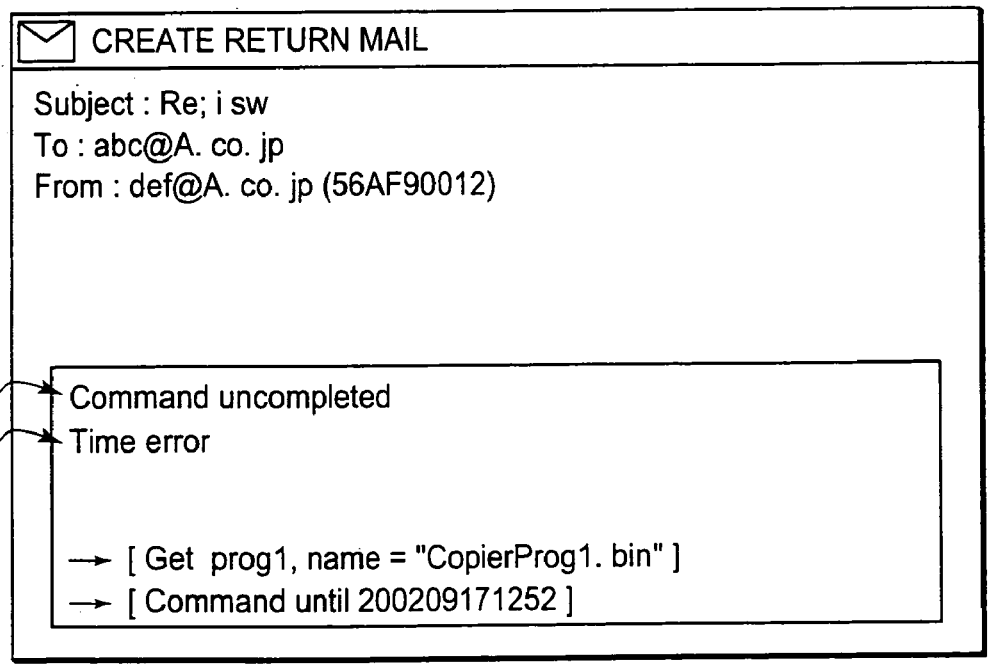
FIG. 16B is a diagram showing an example return E-mail indicating that the instruction E-mail has been invalidated because the validity limit has been reached.

An example instruction E-mail for which the validity limit is designated and an example return E-mail are shown respectively in FIGS. 16A and 16B.

FIG. 16A is a diagram showing an instruction E-mail for which the validity term is designated. As well as in the example for the validity term, the instruction E-mail includes: a command h1, Get prog1, name="CopieProg1.bin; and a command h2 "Command until 200209171252", indicating that the validity limit of the command h1 is 12:52, Sep. 17, 2002.

When the instruction E-mail for which the validity limit is designated is received by the image processing apparatus 2, the current time held by the timer function of the controller 21 is compared with the validity limit for the instruction E-mail to determine whether the instruction E-mail reaches the validity limit. When the validity limit is reached, the return E-mail shown in FIG. 16B is created to notify the updating error, and is transmitted to the transmission source of the instruction E-mail. As is shown in FIG. 16B, the return E-mail includes: a message h3 "Command uncompleted" indicating that, due to an error, the updating process was not performed in accordance with the command; and a message h4 "Time error" indicating the error cause that the validity limit is reached.

In the above explanation, when the maintenance person uses the instruction E-mail to designate the validity term or the validity limit, the image processing apparatus 2 sets up the validity term or the validity limit based on the command included in the instruction E-mail as for the validity term or the validity limit. However, the setup method for the validity term is not limited to this, and, for example, the maintenance person may employ the operating unit 22 to pre-designate a default value for a validity term to the image processing apparatus 2.

Third Embodiment

According to a third embodiment of the present invention, in the processing for obtaining, from a server, update data that are required to update application data for the usage of an image processing apparatus and for updating the application data, a communication test is performed and test data are obtained from the server in accordance with setup information, such as communication parameters, that is designated to obtain the update data, so that whether the setup information has been correctly entered in the image processing apparatus 2 can be determined. This example will now be described.

For the third embodiment, the processing for conducting a communication test is added to the operation for the first or the second embodiment, and since the other operation is the same as that for the first and second embodiment so long as there is no explanatory notice, no further explanation will be given.

Further, since the configuration for an image processing apparatus, data processing apparatuses and a data processing system for this embodiment is the same as that for the first embodiment in FIG. 1, this configuration is not particularly shown, and in the following description, the same reference numerals are employed to corresponding components. That is, a data processing system 100 for the third embodiment comprises: data processing apparatuses 1a and 1b, an image processing apparatus 2 and a server 3. The image processing apparatus 2, the data processing apparatus 1b and the server 3 are connected through the Internet n1 to access each other, while the image processing apparatus 2, the data processing apparatus 1a and an E-mail server M are connected through a LAN n2 that is a network provided within a limited area.

The data processing apparatuses 1a and 1b, the image processing apparatus 2 and the server 3 will now be described according to the third embodiment of the invention.

First, the data processing apparatuses 1a and 1b will be explained.

Since the internal arrangement for the data processing apparatus 1a or 1b is almost the same as that for the first embodiment in FIG. 2, the same reference numerals are used to denote corresponding components, and only different function sections will be described. The data processing apparatus 1a or 1b comprises: a controller 11, an operating unit 12, a display unit 13, a communication unit 14, a RAM 15 and a storage unit 16.

The controller 11 opens, to the RAM 15, a system program and an acquisition method setup program (see FIG. 6) related to the present invention, both of which are stored in the storage unit 16, and totally controls the processing in cooperation with these programs.

In the acquisition method setup processing, in accordance with an instruction entered through the operating unit 12 that is a data acquisition instruction unit, the acquisition method is determined for the image processing apparatus 2 to obtain the update data. When the determined acquisition method is employed to enter various setup information, such as a communication parameter, a user ID and a password, that are necessary to obtain the update data, and when an instruction to conduct a communication test is entered through the operating unit 12, instruction information is generated in order to instruct the acquisition of test data from the server 3 and the start of the communication test. This instruction information is then transmitted through the communication unit 14 to the image processing apparatus 2, together with the setup information required to obtain the update data.

The image processing apparatus 2 will now be described.

Since the internal arrangement of the image processing apparatus 2 is almost the same as that for the first embodiment in FIG. 3, this configuration is not specifically shown, the same reference numerals are used to denote corresponding components, and only different function sections will be explained. The image processing apparatus 2 comprises: a controller 21, an operating unit 22, a display unit 23, a communication unit 24, a RAM 25, a data storage unit 26, a printing unit 27 and a storage unit 28.

The controller 21 opens, to the RAM 15, a system program and a test program (see FIG. 13) related to the present invention, both of which are stored in the storage unit 28, and totally controls the processing in cooperation with these programs. As a result, a data acquisition unit, a data updating unit, an error detection unit and a communication error notification unit can be provided.

When an instruction for the execution of a communication test is entered through the operating unit 12 of the data processing apparatus 1a or 1b, the controller 21 begins the test processing. In the test processing, the controller 21 reads setup information, such as a communication parameter, a user ID and a password, that is designated by the acquisition method stored in the data storage unit 26, and employs the setup information to attempt the acquisition of the test data from the server 3. At this time, a communication error is detected during the process for the connection to the firewall FW and the server 3, and the test data received from the server 3 are examined to detect an error in the test data. When an error is detected during the communication test, notification information that indicates the process step whereat the error is detected is generated, and is transmitted to the transmission source of the communication test instruction information, or is displayed on the display unit 23.

In addition to the system program, data processed by the test program or other programs are stored in the storage unit 28.

The server 3 will now be described.

As is shown in FIG. 5, in the DB 34 of the server 3, the update data for the image processing apparatus 2 are stored in the directory hierarchical structure, and test data "test.dat" that are used for the communication test for the image processing apparatus 2 are also stored.

The operation for the third embodiment will now be described while referring to FIGS. 17A to 19B.

First, the acquisition method setup processing performed by the data processing apparatus 1a or 1b will be described. Since the acquisition method setup processing is the same as that in FIG. 6 for the first embodiment, the flowchart shown in FIG. 6 is employed to explain this processing.

In the acquisition method setup processing in FIG. 6, fist, the data processing apparatus 1a accesses the image processing apparatus 2 through the LAN 2n. When an instruction for activating the browser is entered through the operating unit 12 of the data processing apparatus 1a, the controller 11 activates the browser, and when a maintenance person enters an acquisition method setup request on the screen displayed by the browser, the information for the setup request is transmitted to the image processing apparatus 2 (step S1).

Then, the maintenance person enters a password for maintenance and transmits the password to the image processing apparatus 2. The controller 11 determines whether the access is allowed by the image processing apparatus 2 (step S2). When the access is not allowed (NO at step S2), an error screen is displayed on the display unit 13, and the processing is thereafter terminated. When the access is allowed by the image processing apparatus 2 (YES at step S2), the type of an acquisition method to be designated is determined based on the instruction entered through the operating unit 12 (step S3).

When the use of ftp is determined as the data acquisition method, the instruction information for setting up the ftp is transmitted to the image processing apparatus 2 (step S41). When data for an ftp setup input screen are received from the image processing apparatus 2, a corresponding setup input screen (see FIG. 17A) is displayed on the display unit 13. When the use of an http is determined as the data acquisition method, the instruction information for setting up the http is transmitted to the image processing apparatus 2 (step S42). When data for an http setup input screen are received from the image processing apparatus 2, a corresponding setup input screen (see FIG. 17B) is displayed on the display unit 13. When the use of an E-mail is determined as the data acquisition method, the instruction information for setting up an E-mail is transmitted to the image processing apparatus 2 (step S43). When data for an E-mail setup input screen are received from the image processing apparatus 2, a corresponding setup input screen (see FIG. 17C) is displayed on the display unit 13.

Example setup input screens displayed on the display unit 13 of the data processing apparatus 1a will now be described while referring to FIGS. 17A to 17C.

FIG. 17A is a diagram showing a setup input screen 134 for setting up the ftp acquisition method. The setup input screen 134 includes: dialogue boxes i1 and i2 for entering the server address of the server 3 and a port respectively, so that the server 3 that stores update data is accessed; dialogue boxes i3 and i4 for entering a user ID and a password respectively, in order to authenticate log-in to the server 3; and dialogue boxes i5 and i6 for entering a firewall IP address and a port to pass through a firewall FW and access the Internet n1. Further, a communication test key k2 is displayed on the lower portion of the screen to instruct the execution of a communication test using the designated communication parameter.

FIG. 17B is a diagram showing a setup input screen 135 to set up the http acquisition method. As well as in FIG. 17A, the setup input screen 135 includes: dialogue boxes i1 and i2 for entering the server address of the server 3 and a port respectively, so that the server 3 is accessed; dialogue boxes i3 and i4 for entering a user ID and a password to authenticate the log-in to the server 3; and dialogue boxes i5 and i6 for entering a firewall IP address and a port, respectively. Further, a communication test key k2 is displayed on the lower portion of the screen.

FIG. 17C is a diagram showing a setup input screen 136 to set up the E-mail acquisition method. The setup input screen 136 includes: a dialogue box j1 for entering the address of the E-mail server M; dialogue boxes j2 and j3 for entering a user ID and a password respectively to authenticate the log-in to the E-mail server M; and a dialogue box j4 for entering thE-mail address of the image processing apparatus 2. Further, a communication test key k2 is displayed on the lower portion of the screen.

Therefore, when the maintenance person enters, to the dialogue boxes of one of the setup input screens 134 to 136, the corresponding setup information required to designate the data acquisition method, the acquisition method can be designated through the browser. When a communication test is to be conducted after the setup information has been entered, the communication test key k2 is depressed on one of the setup input screens (FIGS. 17A to 17C).

Referring again to FIG. 6, the communication parameter, the user ID and the password are entered on the setup input screen displayed on the display unit 13 at step S5 (step S7). When the communication test key k2 is thereafter depressed through the operating unit 12, the setup information of the communication parameter, the user ID and the password is transmitted through the communication unit 14 to the image processing apparatus 2, and the instruction information is also transmitted to instruct the start of the communication test (step S8). Then, depending on whether a setup end notification is received from the image processing apparatus 2, the controller 11 determines whether the setup is completed (step S9).

When the setup end notification is received, the controller 11 ascertains that the setup is completed (YES at step S9), and the processing is thereafter terminated. When an error notification is received, or when the setup end notification is not received after a predetermined period of time has elapsed, the controller 11 ascertains that the setup is not completed (NO at step S9). Program control returns to step S3, the acquisition method is determined again, and the processes at steps S3 to S8 are repeated.

In the above description, the browser of the data processing apparatus 1a is employed for the setup. However, the same setup may be performed by using the operating unit 12 of the image processing apparatus 2.

The test processing performed by the image processing apparatus 2 will now be described while referring to FIG. 18. In the test processing, before update data are obtained from the server 3, whether the communication parameter has been correctly designated for the image processing apparatus 2 is determined.

In this embodiment, through the manipulation of the maintenance person, the instruction information for the execution of the communication test is received from the data processing apparatus 1a, and the test processing is begun by the image processing apparatus 2. However, the instruction to conduct the communication test may be issued from the data processing apparatus 1b, or by using the operating unit 22 of the image processing apparatus 2.

Figure 18:
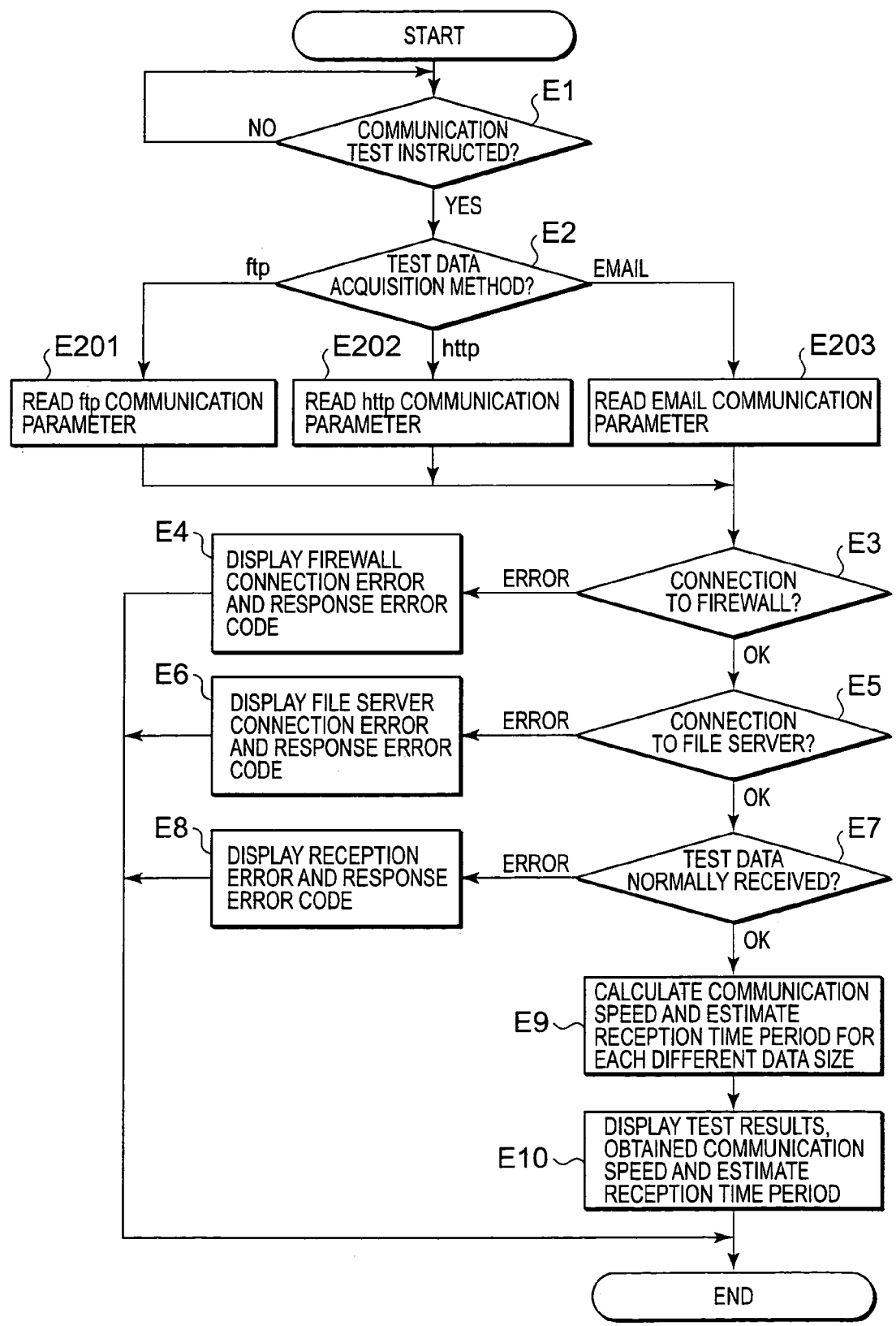
FIG. 18 is a flowchart for explaining the test processing performed by an image processing apparatus.

In the test processing in FIG. 18, first, a check is performed to determine whether the instruction information to conduct the communication test is received from the data processing apparatus 1a through the communication unit 24 (step E1). When the instruction information for the communication test is received (YES at step E1), request information is generated to request the test data for the communication test. In this embodiment, the request information includes the information of a URL that represents the storage location of the text data. Then, a check is performed to determine which acquisition method, the ftp, the http or the E-mail, is stored in the data storage unit 26 to obtain the application data (step E2).

When the ftp acquisition method is designated (ftp at step E2), the setup information, including the communication parameter, the user ID and the password, that is designated for the ftp acquisition method is read from the data storage unit 26 (step E201). Then, program control is shifted to step E3.

When the http acquisition method is designated (http at step E2), the setup information such as the communication parameter, which is designated for the http acquisition method, is read from the data storage unit 26 (step E202) Program control is then shifted to setup E3.

When the E-mail acquisition method is designated (E-mail at step E2), the setup information such as the communication parameter, which is designated for the E-mail acquisition method, is read from the data storage unit 26 (step E203), and program control is shifted to step E3.

At step E3, the obtained communication parameter is employed to attempt the connection to the firewall FW through the communication unit 24, and a check is performed to determine whether the connection to the firewall FW is established. That is, a communication error is examined in the process of the connection to the firewall FW. When the connection to the firewall FW fails (ERROR at step E3), it is assumed that the setup information for the firewall FW, such as the address of the firewall FW and the connection port, is incorrect. Then, a communication error message is displayed on the display unit 23 to notify the communication test results that the connection to the firewall FW is not established, and a response error code is also displayed, indicating that the connection error has occurred in the process of the connection to the firewall FW (step E4).

An example test results screen displayed when a communication error has occurred is shown in FIG. 19A. As is shown in FIG. 19A, the test results screen includes: a message m1, indicating that test data can not be received due to the occurrence of a communication error; and a response error code m2, representing the type of the communication error.

When the connection to the firewall FW is established (OK at step E3), the connection to the server 3 is attempted, and whether the connection to the server 3 is established is determined (step E5). That is, a communication error is examined in the process of the connection to the server 3. When the connection to the server 3 is not established (ERROR at step E5), it is assumed that the setup information for the server 3, such as the address of the server 3, the connection port, the user name and the password, is incorrect. Then, a communication error message is displayed on the display unit 23 to notify that the connection to the server 3 is not established, and a response error code is also displayed, indicating that the communication error has occurred in the process of the connection to the server 3 (step E6).

When the connection to the server 3 is established (OK at step E5), the request information for the test data is transmitted through the communication unit 24 to the server 3. Upon receipt of the test data request information from the image processing apparatus 2, the test data that corresponds to the URL included in the request information are read from the DB 34 of the server 3, and are transmitted to the image processing apparatus 2. The image processing apparatus 2 determines whether the test data are normally received from the server 3 (step E7). That is, the detection for a communication error is performed in the reception process.

When the test data are not normally received, or when as the results of checking the received test data, an abnormality has occurred in the test data (ERROR at step E7), it is assumed that a transmission error has occurred to the incorrect setup of the communication parameter on the server 3 side. Then, a reception error message, indicating that the test data can not be received or that an error has occurred in the test data, and a response error code, indicating that the communication error has occurred in the reception process, are displayed on the display unit 23 (step E8).

When the test data are normally received from the server 3 (OK at step E7), the period of time required until the test data were received (hereinafter referred to as a reception period) and the size of the test data are employed to calculate the communication speed using the following equation (1) (step E9):

$$\text{Communication speed (bps)} = \text{test data size (bit)} / \text{reception period (sec)} \quad (1)$$

To present an period of time for receiving application data from the server 3 at the current communication speed, based on the above described communication speed, an estimate period required for the data reception is calculated for each different data size. For example, the estimate period of time when the data size of application data is 1 M (mega) byte, or the estimate period of time for 5 M bytes, or the estimate period of time for 10 Mbytes is calculated.

When the size of the update data to be obtained from the server 3 is known in advance, the estimate period of time corresponding to the data size may be calculated. Therefore, the information consonant with the actual status can be provided for the maintenance person.

At step E10, a test results screen 231 (see FIG. 19B) is displayed on the display unit 23 to notify that a communication error is not detected and the test data have been normally received, i.e., that the correct communication parameter has been set up. On the test results screen 231, the communication speed and the estimate period of time required for the reception of update data, which are obtained at step E9, are displayed on the list with the test results.

The test results screen 231 may be displayed on the display unit 13 of the data processing apparatus 1a. In this case, the information displayed on the test results screen 231 is transmitted from the image processing apparatus 2 to the data processing apparatus 1a, and is displayed on the display unit 13 of the data processing apparatus 1a.

As is described above, after the setup information, such as the communication parameter, that the image processing apparatus 2 requires to obtain the update data from the server 3 is designated to the image processing apparatus 2, the image processing apparatus 2 performs the communication test and obtains test data from the server 3. Thus, whether the setup information necessary for obtaining the update data is correctly set up can be easily determined, and the job efficiency for the maintenance person can be improved.

When a communication error has occurred as the results of the communication test, an error is displayed at a communication step whereat a communication error has occurred, and which step whereat the communication error has occurred is represented by using a response error code. Therefore, the maintenance person can easily correct the setup information.

Further, since test data in a small data size is employed for the communication test, the period required for the reception of the test data can be reduced. Therefore, the communication test can be conducted for a short period of time, and the load imposed on the maintenance person can be more reduced.

Furthermore, since the communication speed can be calculated based the test data reception results, and can be displayed together with the results of the communication test, the maintenance person can understand the current communication state. To obtain the update data from the server 3, the maintenance person can determine the communication state based on the communication speed on the display, and can take various countermeasures, such as putting off the acquisition of update data from the server 3 when the traffic is heavy. As a result, the maintenance job efficiency can be increased.

In addition, based on the communication speed obtained through the calculation, the estimate period of time required for the data reception is calculated for each different data size, and is displayed. Therefore, the maintenance person can easily understand the approximate period of time required for the data reception.

The third embodiment is merely an example for the image processing apparatus, the data processing apparatuses, the server and the data processing system according to the present invention. However, the detailed configuration and the detailed operation are not limited to those for the third embodiment, and can be modified as needed without departing from the subject of the present invention.

The first to third embodiments have been explained; however, all of these embodiments may been employed together, or these embodiments may be arbitrarily selected and employed together.

In the above described embodiments, when the image processing apparatus 2 is performing another process, an error process is performed to inhibit the acquisition of the update data. However, the acquisition of the update data may be enabled, while the updating of the data is inhibited. Further, when the image processing apparatus 2 is performing another process, the data updating may be inhibited.

What is claimed is:

1. An image processing apparatus comprising:
    data storage means for storing application data concerning usage of said image processing apparatus so that rewriting of said application data is enabled;
    control means for controlling an operation of said image processing apparatus based on said application data stored in said data storage means;
    data acquisition means for accessing a server that stores application data, which is used for updating, as update data, and for obtaining said update data;
    data updating means for rewriting said application data stored in said data storage means to provide said update data obtained by said data acquisition means; and
    acquisition method storage means for storing, in advance, an acquisition method designated for obtaining said update data,
    wherein, when instruction information for instructing updating of said application data is entered in said image processing apparatus, said data acquisition means accesses said server in accordance with said acquisition method stored in said acquisition method storage means and obtains said update data.

2. An image processing apparatus according to claim 1, wherein said acquisition method storage means stores setup data that are required to obtain said update data using said acquisition method designated in advance.

3. An image processing apparatus according to claim 2, wherein said setup data includes an address for said server that stores the update data and an ID or a password for accessing said server.

4. An image processing apparatus according to claim 1, wherein said acquisition method is one of a method using HTTP (Hyper-Text Transfer Protocol) and a method using FTP (File Transfer Protocol).

5. An image processing apparatus according to claim 4, wherein said instruction information includes data type information indicating a type of said update data; and
    wherein, at least based on one of: (i) the data type information included in said instruction information, (ii) identification data for said image processing apparatus that is stored in said image processing apparatus, said identification data including one of a serial number unique to said image processing apparatus, a product number, a model name, a product version, a model version, and an application data version, said data acquisition means specifies update data stored in one of an HTTP server and an FTP server and obtains said specified update data from said one of the HTTP server and the FTP server.

6. An image processing apparatus according to claim 1, wherein said acquisition method is a method using electronic mail.

7. An image processing apparatus according to claim 1, wherein said instruction information is received from an external device connected to said image processing apparatus.

8. An image processing apparatus according to claim 1, further comprising:
    validity condition setup means for setting a condition for a validity term or a validity limit under which said data acquisition means obtains said update data or said data update means updates said application data; and
    inhibiting means for, when said instruction information entered for said image processing apparatus does not satisfy said condition designated by said validity condition setup means, inhibiting the operation of said data acquisition means for acquiring said update data, or of said data updating means for updating said application data.

9. An image processing apparatus according to claim 8, wherein said validity condition setup means designates said condition concerning said validity term or said validity limit one of: (i) based on validity information for said validity term or said validity limit included in said instruction information, (ii) in accordance with an instruction received from an external device connected to said image processing apparatus, and (iii) an instruction entered using said operating means of said image processing apparatus.

10. An image processing apparatus according to claim 1, further comprising:
- validity condition setup means for setting a condition for a validity term or a validity limit under which said data acquisition means obtains said update data or said data update means updates said application data; and
- instruction error notification means for, when said instruction information entered for said image processing apparatus does not satisfy said condition designated by said validity condition setup means, issuing a notification to a transmission source of said instruction information that said instruction information does not satisfy said condition concerning said validity term or said validity limit.

11. An image processing apparatus according to claim 1, wherein said data acquisition means accesses said server by using said acquisition method stored in said acquisition method storage means, and obtains test data for a communication test.

12. An image processing apparatus according to claim 11, further comprising:
- error detection means for, when said test data are obtained by said data acquisition means, detecting one of an error that has occurred before said test data are obtained and an error in said obtained test data; and
- communication error notification means for providing notification that said error has been detected by said error detection means.

13. An image processing apparatus according to claim 1, which inhibits said data acquisition means from obtaining said update data, or said data updating means from updating said application data, while said image processing apparatus is performing another process.

14. An image processing apparatus comprising:
- data storage means for storing application data concerning usage of said image processing apparatus so that rewriting of said application data is enabled;
- control means for controlling an operation of said image processing apparatus based on said application data stored in said data storage means;
- data acquisition means for accessing a server that stores application data, which is used for updating, as update data, and for obtaining said update data;
- data updating means for rewriting said application data stored in said data storage means as said update data obtained by said data acquisition means; and
- acquisition method selection means for selecting, from among a plurality of acquisition methods for obtaining said update data, an acquisition method to be used for the acquisition of said update data,
- wherein, when instruction information for instructing updating of said application data is entered in said image processing apparatus, said data acquisition means accesses said server by using said acquisition method selected by said acquisition method selection means and obtains said update data.

15. An image processing apparatus according to claim 14, wherein said acquisition method selection means designates setup data required to obtain said update data using said selected acquisition method.

16. An image processing apparatus according to claim 15, wherein said setup data includes an address for said server that stores said update data, and a required ID or password for accessing said server.

17. An image processing apparatus according to claim 16, wherein the acquisition method selection means designates said setup data based on one of setup data entered using an operating unit for said image processing apparatus and setup data entered using an external device connected to said image processing apparatus.

18. An image processing apparatus comprising:
- data storage means for storing application data concerning usage of said image processing apparatus so that rewriting of said application data is enabled;
- control means for controlling an operation of said image processing apparatus based on said application data stored in said data storage means;
- data acquisition means for accessing a server that stores application data, which is used for updating, as update data, and for obtaining said update data; and
- data updating means for rewriting said application data stored in said data storage means to provide said update data obtained by said data acquisition means,
- wherein a plurality of acquisition methods for obtaining said update data are selectably prepared, in advance.

19. An image processing apparatus comprising:
- data storage means for storing application data concerning usage of said image processing apparatus so that rewriting of said application data is enabled;
- control means for controlling an operation of said image processing apparatus based on said application data stored in said data storage means;
- data acquisition means for accessing a server that stores application data, which is used for updating, as update data, and for obtaining said update data; and
- data updating means for rewriting said application data stored in said data storage means to provide said update data obtained by said data acquisition means,
- wherein, when instruction information for instructing updating of said application data is entered in said image processing apparatus, said data acquisition means specifies update data, stored in said server, at least based on one of data type information which indicates a type of update data and which is included in said instruction information and identification information which is stored in said image processing apparatus and which identifies the image processing apparatus, and said data acquisition means obtains said specified update data from said server.

20. An image processing apparatus according to claim 19, wherein said identification information includes one of a serial number unique to said image processing apparatus, a product name, a model name, a product version, a model version and an application data version.

21. An image processing apparatus comprising:
- data storage means for storing application data concerning usage of said image processing apparatus so that rewriting of application data is enabled;
- control means for controlling an operation of said image processing apparatus based on said application data stored in said data storage means;
- data acquisition means for accessing a server that stores application data, which is used for updating, as update data, and for obtaining said update data;
- data updating means for rewriting said application data stored in said data storage means to provide said update data obtained by said data acquisition means;
- validity condition setup means for setting a condition for a validity term or a validity limit under which said application data is updated by said data updating means; and
- inhibiting means for, when said condition set by said validity condition setup means is not satisfied, inhibiting the operation of said data updating means for updating said application data.

22. An image processing apparatus according to claim 21, further comprising:

instruction error notification means for issuing, when said instruction information entered in said image processing apparatus for instructing the updating of said application data does not satisfy said condition designated by said validity condition setup means, a notification provided for a transmission source of said instruction information notifying that said instruction information does not satisfy said condition for said validity term or said validity limit.

23. An image processing apparatus according to claim 22, wherein said validity condition setup means designates said condition for said validity term or said validity limit one of: (i) based on validity information for said validity term or said validity limit that is included in said instruction information, (ii) in accordance with an instruction received from an external device connected to said image processing apparatus, and (iii) an instruction entered at an operating unit of said image processing apparatus.

24. An image processing apparatus comprising:

data storage means for storing application data concerning usage of said image processing apparatus so that rewriting of said application data is enabled;

control means for controlling an operation of said image processing apparatus based on said application data stored in said data storage means;

data acquisition means for accessing a server that stores, as update data, application data used for updating, and for obtaining said update data;

data updating means for rewriting said application data stored in said data storage means to provide said update data obtained by said data acquisition means;

validity condition setup means for setting a condition for a validity term or a validity limit under which said application data is acquired by said data acquisition means; and inhibiting means for inhibiting, when said condition set by said validity condition setup means is not satisfied, an operation of said data acquisition means for obtaining said application data.

25. A data processing apparatus, which transmits, to an image processing apparatus that stores application data that concerns usage of said image processing apparatus and that is to be rewritten, instruction information instructing acquisition, from a server, of update data for said application data and rewriting of said application data using said update data, wherein validity data designating a condition for a validity term or a validity limit, for obtaining said update data or for updating said application data, are added to said instruction information and are transmitted to said image processing apparatus.

26. An image processing apparatus comprising:

data storage means for storing application data concerning usage of said image processing apparatus so that rewriting of said application data is enabled;

control means for controlling an operation of said image processing apparatus based on said application data stored in said data storage means;

data acquisition means for accessing a server that stores application data, which is used for updating, as update data, and for obtaining said update data; and data updating means for rewriting said application data stored in said data storage means using said update data obtained by said data acquisition means, wherein, upon receiving an instruction to obtain test data for a communication test which are stored by said server, said data acquisition means accesses said server and obtains said test data from said server.

27. An image processing apparatus according to claim 26, further comprising:

error detection means for, when said test data are obtained by said data acquisition means, detecting one of an error that occurred up until said test data were obtained and an error in said obtained test data; and communication error notification means for transmitting notification of said error detected by said error detection means.

28. A data processing apparatus, which transmits, to an image processing apparatus that stores application data that concerns usage of said image processing apparatus and that is to be rewritten, instruction information instructing acquisition from a server of update data for said application data and rewriting of said application data using said update data, said data processing apparatus comprising:

setup instruction means for instructing said image processing apparatus to instruct a setup of an acquisition method for obtaining said update data; and data acquisition instruction means for instructing said image processing apparatus to obtain test data for a communication test.

* * * * *